US011823191B1

(12) United States Patent
Bedi et al.

(10) Patent No.: US 11,823,191 B1
(45) Date of Patent: Nov. 21, 2023

(54) INTEGRATION FOR PERFORMING ACTIONS WITHOUT ADDITIONAL AUTHORIZATION REQUESTS

(71) Applicant: Block, Inc., San Francisco, CA (US)

(72) Inventors: Deepkarn Bedi, Sausalito, CA (US); Maxwell Beatty, San Francisco, CA (US); Craig Petzel, Santa Monica, CA (US); Michalina Simik, Austin, TX (US); Matthew Krueger, Naples, FL (US)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 17/946,375

(22) Filed: Sep. 16, 2022

Related U.S. Application Data

(60) Provisional application No. 63/401,808, filed on Aug. 29, 2022.

(51) Int. Cl.
*G06Q 20/40* (2012.01)
*G06Q 20/32* (2012.01)

(52) U.S. Cl.
CPC ....... *G06Q 20/4014* (2013.01); *G06Q 20/327* (2013.01); *G06Q 20/4012* (2013.01)

(58) Field of Classification Search
CPC ............ G06Q 20/4014; G06Q 20/327; G06Q 20/4012
See application file for complete search history.

(56) References Cited

U.S. PATENT DOCUMENTS 5,787,402 A 7/1998 Potter et al.
6,330,550 B1 12/2001 Brisebois et al.
(Continued)

FOREIGN PATENT DOCUMENTS

JP 2003-256522 A 9/2003
KR 10-2000-0072676 A 12/2000
(Continued)

OTHER PUBLICATIONS

"Going Dutch," Wikipedia, Retrieved from the Internet URL: https://en.wikipedia.org/w/index.php?title=Going%20Dutch&%20oldi%20d=45401476, on Mar. 25, 2016, pp. 1-2.
(Continued)

*Primary Examiner* — Patrick McAtee
*Assistant Examiner* — Vincent I Idiake
(74) *Attorney, Agent, or Firm* — Lee & Hayes, P.C.

(57) ABSTRACT

Techniques, devices, and systems for performing actions, within an application provided by a service provider, without additional authorization requests are described. An example process includes receiving an access request to access an application on a user device, and presenting an interactive element via a user interface of the application, wherein the interactive element, when selected, causes a website of a merchant to load to an in-app browser within the application. The example process further includes receiving, via the in-app browser, a payment request to initiate a payment to the merchant from an account associated with the application, determining, based at least in part on the payment request, that the payment request originated from within the application, and based at least in part on the determining, causing the payment to be authorized without additional input from a user associated with the user device.

20 Claims, 12 Drawing Sheets

(56) References Cited

U.S. PATENT DOCUMENTS

| | | | |
|---|---|---|---|
| 7,269,251 B1 | 9/2007 | Jokinen | |
| 7,606,734 B2 | 10/2009 | Baig et al. | |
| 7,716,129 B1 | 5/2010 | Tan et al. | |
| 7,725,375 B2 | 5/2010 | Shepherd | |
| 7,814,017 B2 | 10/2010 | Vancini et al. | |
| 8,010,993 B1 | 8/2011 | Bartholomay et al. | |
| 8,140,418 B1 | 3/2012 | Casey et al. | |
| 8,380,591 B1 | 2/2013 | Kazenas et al. | |
| 8,401,968 B1 | 3/2013 | Schattauer et al. | |
| 8,447,666 B1 | 5/2013 | Keld | |
| 8,539,568 B1 | 9/2013 | Milas | |
| 8,571,975 B1 | 10/2013 | Ehman et al. | |
| 8,606,703 B1 | 12/2013 | Dorsey et al. | |
| 8,639,621 B1 | 1/2014 | Ellis et al. | |
| 8,688,540 B1 | 4/2014 | Patel et al. | |
| 8,874,477 B2 | 10/2014 | Hoffberg | |
| 9,402,000 B2 | 7/2016 | Raj et al. | |
| 9,875,469 B1 | 1/2018 | Chin et al. | |
| 9,922,324 B2 | 3/2018 | Wilson et al. | |
| 10,102,518 B2 | 10/2018 | Arthur et al. | |
| 10,510,034 B2 | 12/2019 | Arson et al. | |
| 10,510,079 B2 | 12/2019 | Arson et al. | |
| 11,042,863 B1 | 6/2021 | Omojola | |
| 11,288,642 B1 * | 3/2022 | Hawes | G06Q 20/102 |
| 2002/0029342 A1 | 3/2002 | Keech | |
| 2002/0111907 A1 | 8/2002 | Ling | |
| 2002/0147658 A1 | 10/2002 | Kwan | |
| 2003/0217005 A1 | 11/2003 | Drummond et al. | |
| 2004/0267660 A1 | 12/2004 | Greenwood et al. | |
| 2005/0021400 A1 | 1/2005 | Postrel | |
| 2005/0050145 A1 | 3/2005 | Lowe | |
| 2005/0192893 A1 | 9/2005 | Keeling et al. | |
| 2005/0273405 A1 | 12/2005 | Chen | |
| 2006/0006226 A1 | 1/2006 | Fitzgerald et al. | |
| 2006/0131385 A1 | 6/2006 | Kim | |
| 2006/0208066 A1 | 9/2006 | Finn et al. | |
| 2007/0119918 A1 | 5/2007 | Hogg et al. | |
| 2007/0192191 A1 | 8/2007 | Neal et al. | |
| 2007/0198360 A1 | 8/2007 | Rogers et al. | |
| 2007/0198432 A1 | 8/2007 | Pitroda et al. | |
| 2007/0271342 A1 | 11/2007 | Brandt et al. | |
| 2008/0059375 A1 | 3/2008 | Abifaker | |
| 2008/0189186 A1 | 8/2008 | Choi et al. | |
| 2008/0276308 A1 | 11/2008 | Graser et al. | |
| 2008/0301056 A1 * | 12/2008 | Weller | G06Q 20/382 705/67 |
| 2009/0228966 A1 | 9/2009 | Parfene et al. | |
| 2009/0270077 A1 | 10/2009 | Fiorini et al. | |
| 2010/0017334 A1 | 1/2010 | Itoi et al. | |
| 2010/0121764 A1 | 5/2010 | Niedermeyer | |
| 2010/0131409 A1 | 5/2010 | Lawyer et al. | |
| 2010/0186066 A1 | 7/2010 | Pollard | |
| 2010/0198728 A1 | 8/2010 | Aabye et al. | |
| 2011/0022472 A1 | 1/2011 | Zon | |
| 2011/0035287 A1 | 2/2011 | Fox | |
| 2011/0047045 A1 | 2/2011 | Brody et al. | |
| 2011/0082767 A1 | 4/2011 | Ryu et al. | |
| 2011/0113068 A1 | 5/2011 | Ouyang et al. | |
| 2011/0119155 A1 | 5/2011 | Hammad et al. | |
| 2011/0218880 A1 | 9/2011 | Hammad et al. | |
| 2011/0219230 A1 | 9/2011 | Oberheide et al. | |
| 2011/0238539 A1 | 9/2011 | Phillips et al. | |
| 2011/0287726 A1 | 11/2011 | Huang | |
| 2011/0307388 A1 | 12/2011 | Kim et al. | |
| 2012/0036042 A1 | 2/2012 | Graylin et al. | |
| 2012/0101896 A1 | 4/2012 | Veeneman et al. | |
| 2012/0130898 A1 | 5/2012 | Snyder et al. | |
| 2012/0131121 A1 | 5/2012 | Snyder et al. | |
| 2012/0143722 A1 | 6/2012 | John | |
| 2012/0166334 A1 | 6/2012 | Kimberg et al. | |
| 2012/0191569 A1 | 7/2012 | Shah | |
| 2012/0226588 A1 | 9/2012 | Wuhrer et al. | |
| 2012/0295580 A1 | 11/2012 | Corner | |
| 2012/0310752 A1 | 12/2012 | Gaddis | |
| 2012/0323717 A1 | 12/2012 | Kirsch | |
| 2013/0041821 A1 | 2/2013 | Kingston et al. | |
| 2013/0046707 A1 | 2/2013 | Maskatia et al. | |
| 2013/0054395 A1 | 2/2013 | Cyr et al. | |
| 2013/0080415 A1 | 3/2013 | Maskatia et al. | |
| 2013/0085804 A1 | 4/2013 | Leff et al. | |
| 2013/0138535 A1 | 5/2013 | Hsiao | |
| 2013/0159173 A1 | 6/2013 | Sivaraman et al. | |
| 2013/0291099 A1 | 10/2013 | Donfried et al. | |
| 2013/0297425 A1 | 11/2013 | Wallaja | |
| 2013/0305367 A1 | 11/2013 | Yoshioka et al. | |
| 2014/0019290 A1 | 1/2014 | Beaver | |
| 2014/0019352 A1 | 1/2014 | Shrivastava | |
| 2014/0046830 A1 | 2/2014 | Orozco et al. | |
| 2014/0108235 A1 | 4/2014 | Chelst et al. | |
| 2014/0108263 A1 | 4/2014 | Ortiz et al. | |
| 2014/0164254 A1 | 6/2014 | Dimmick | |
| 2014/0180826 A1 | 6/2014 | Boal | |
| 2014/0201067 A1 | 7/2014 | Lai et al. | |
| 2014/0214568 A1 | 7/2014 | Argue et al. | |
| 2014/0214658 A1 | 7/2014 | Hammad et al. | |
| 2014/0230039 A1 | 8/2014 | Prakash et al. | |
| 2014/0236838 A1 | 8/2014 | Asar et al. | |
| 2014/0249948 A1 | 9/2014 | Graylin et al. | |
| 2014/0307735 A1 | 10/2014 | Lerner | |
| 2014/0351118 A1 | 11/2014 | Zhao | |
| 2014/0351126 A1 | 11/2014 | Priebatsch | |
| 2015/0006529 A1 | 1/2015 | Kneen et al. | |
| 2015/0052062 A1 | 2/2015 | Flomin et al. | |
| 2015/0052064 A1 * | 2/2015 | Karpenko | G06Q 20/3829 705/71 |
| 2015/0095990 A1 | 4/2015 | Ranganathan et al. | |
| 2015/0100482 A1 | 4/2015 | Zamer et al. | |
| 2015/0134518 A1 | 5/2015 | Turovsky et al. | |
| 2015/0242840 A1 | 8/2015 | Kursun | |
| 2015/0281238 A1 | 10/2015 | Ramachandran et al. | |
| 2015/0293622 A1 | 10/2015 | Han et al. | |
| 2015/0304250 A1 | 10/2015 | Zomet et al. | |
| 2015/0332230 A1 | 11/2015 | Gaines et al. | |
| 2015/0339656 A1 | 11/2015 | Wilson et al. | |
| 2015/0339668 A1 | 11/2015 | Wilson et al. | |
| 2016/0042328 A1 | 2/2016 | Teckchandani et al. | |
| 2016/0300224 A1 | 10/2016 | Liu et al. | |
| 2017/0154323 A1 | 6/2017 | Bohrer et al. | |
| 2018/0005220 A1 * | 1/2018 | Laracey | G06Q 20/3278 |
| 2018/0047008 A1 | 2/2018 | Ayyagari et al. | |
| 2020/0097972 A1 * | 3/2020 | Karnik | G06Q 20/4014 |
| 2020/0118128 A1 | 4/2020 | Wilson et al. | |
| 2020/0242617 A1 * | 7/2020 | Kumar | G06Q 20/405 |
| 2021/0056581 A1 * | 2/2021 | Kumar | G06Q 40/02 |
| 2021/0287194 A1 * | 9/2021 | Arumugam | G06Q 20/401 |
| 2021/0312417 A1 | 10/2021 | Omojola | |
| 2023/0033992 A1 | 2/2023 | Wilson et al. | |

FOREIGN PATENT DOCUMENTS

| | | | | |
|---|---|---|---|---|
| WO | WO-2014108762 A2 * | 7/2014 | | G06Q 30/02 |
| WO | 2015/179681 A1 | 11/2015 | | |

OTHER PUBLICATIONS

Apple Inc., "In App Purchase Programming Guide," published Jun. 17, 2011, Retrieved from the Internet URL: https://www.rapid-ideas.com/previews/wsa/page9/files/StoreKitGuide.pdf, pp. 1-38.

* cited by examiner

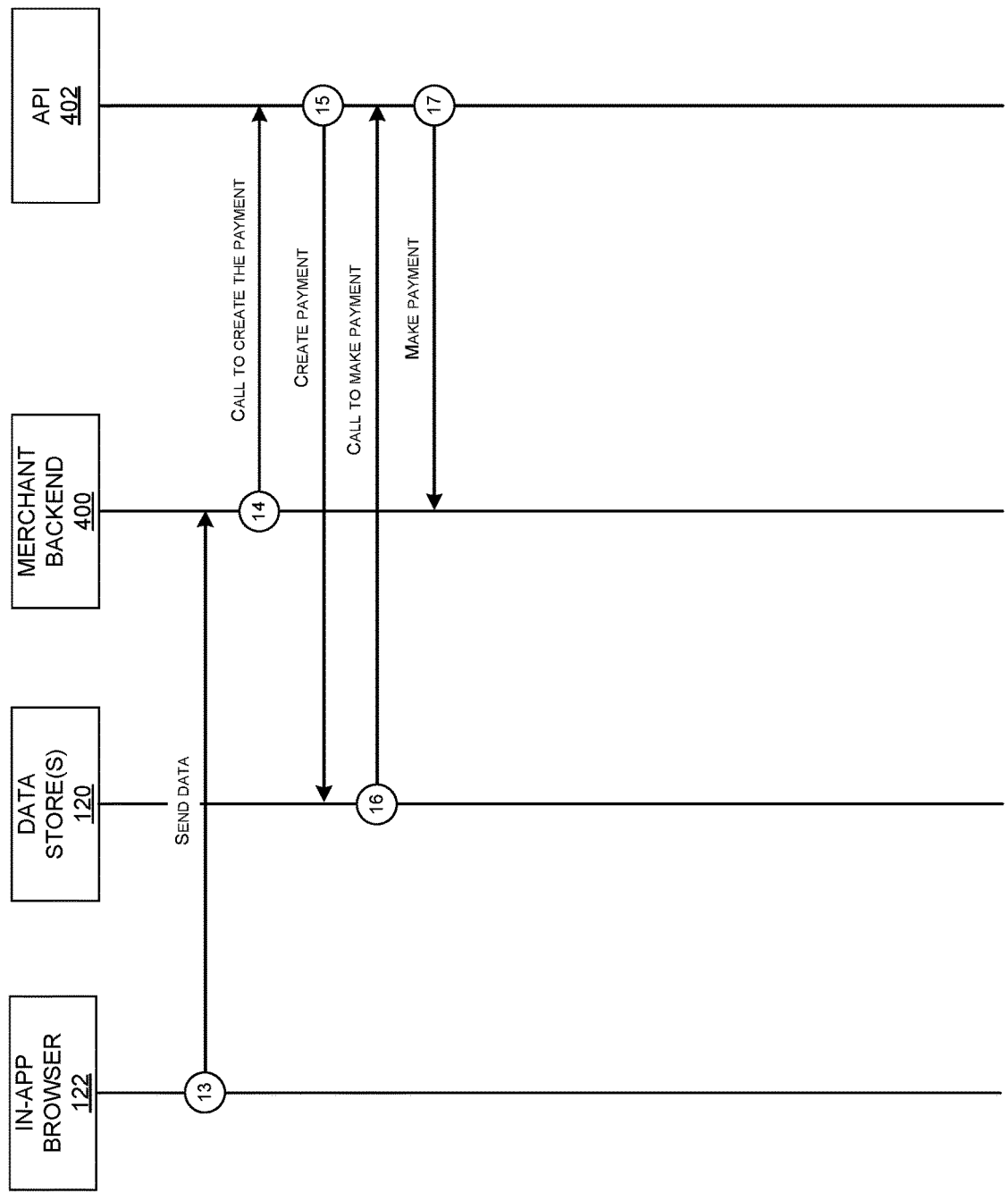

INTEGRATION FOR PERFORMING ACTIONS WITHOUT ADDITIONAL AUTHORIZATION REQUESTS

CROSS REFERENCE TO RELATED APPLICATION

This patent application claims priority to U.S. Provisional Patent Application Ser. No. 63/401,808, filed Aug. 29, 2022, which is hereby incorporated in its entirety by reference.

TECHNICAL FIELD

Applications, which are downloadable and executable on user devices, enable users to interact with other users. Such applications are provided by service providers and utilize one or more network connections to transmit data among and between user devices to facilitate such interactions.

BRIEF DESCRIPTION OF THE DRAWINGS

Features of the present disclosure, its nature and various advantages, will be more apparent upon consideration of the following detailed description, taken in conjunction with the accompanying drawings.

FIGS. 4A and 4B illustrate an example signal flow diagram for authorizing a payment without additional authorization input from the user, the payment having been requested by a user via an in-app browser, according to an implementation of the present subject matter.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
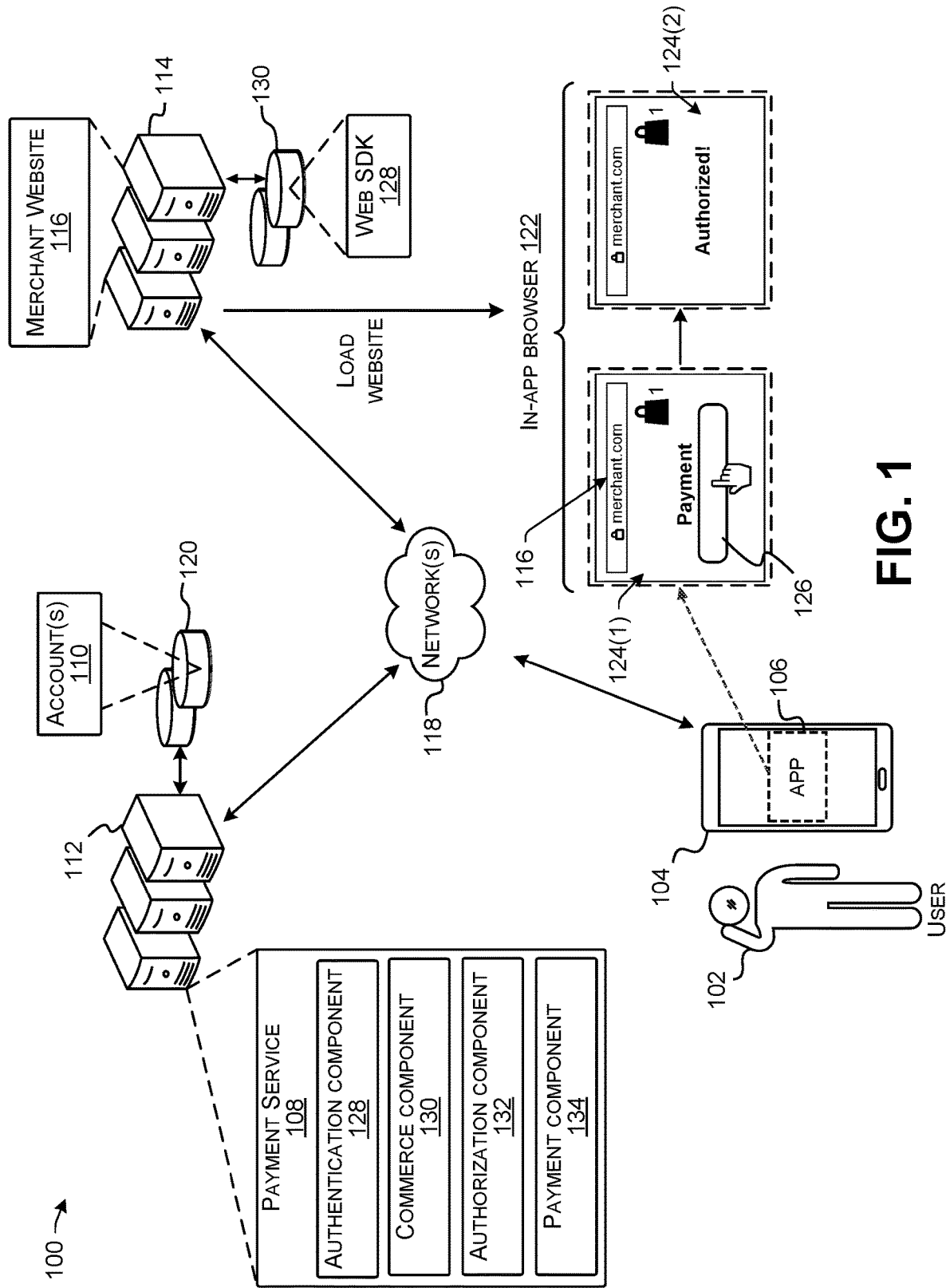
FIG. 1 is an example environment for performing actions, from within an application wherein authorization has been provided, without additional authorization requests and/or input, according to an implementation of the present subject matter.

Described herein are, among other things, techniques, devices, and systems for performing actions, within an application provided by a service provider, such as a payment service, content service, or the like, without additional authorization requests. In an example, instances of an application installed on respective user devices may allow users to, among other things, access third-party websites, such as merchant websites, from within the application. Such access to these merchant websites may be enabled via an in-app browser that renders a merchant website as a view within the application (sometimes referred to herein as a "web view"). In addition, the merchants may have previously integrated a payment method associated with the application into their websites to allow users to use respective accounts that are associated with the application (sometimes referred to herein as "application-associated accounts") to make payments on the merchant websites (e.g., to purchase items). An application-associated account, as described herein, may allow a user to make a payment on a third-party merchant's website using just the application, without having to enter information associated with a payment instrument, such as a credit card number, a debit card number, or the like, thereby increasing security and reducing processing power as less steps are taken within the techniques described herein. The techniques, devices, and systems described herein allow for automatically authorizing the use of an application-associated account on a third-party merchant website based at least in part on a determination that a request to initiate a payment using the application-associated account originated from within the application. Such "automatic authorization" enables the payment to be authorized without an authorization request and/or further input from the user which reduces the required processing power and complexity of the system because an authorization request does not need to be sent, and any additional steps in authorizing a payment are not taken.

In an example, a request to access an application on a user device may be received. In response to this access request, an interactive element may be presented via a user interface of the application. The interactive element can be associated with a search user interface, a merchant marketplace user interface, a discount, loyalty, coupon, or other savings user interface, a merchant profile, an activity feed user interface, or the like. Selection of this interactive element may cause a website of a merchant to load to an in-app browser within the application. If a request to initiate a payment to the merchant from an account associated with the application is received via the in-app browser, a determination may be made as to whether the request originated from within the application or from outside of the application. Upon determining that the request originated from within the application, the payment may be authorized without additional input from the user. That is, the payment may be authorized automatically based at least in part on the request having originated from within the application (with which the user has already authenticated and authorized for use in future payments), which increases the security of the system as the user has been authenticated and authorized. Further, less processing power is required because the user associated with a user device does not need to be authenticated each time they use the application, thereby reducing the complexity of the system.

To illustrate, a user may open an application (e.g., a mobile application, such as a payment application, a social networking application, a content creation application, a content streaming application, etc.), provided by a service provider, on a user device and may navigate to a website of a merchant from within the application, such as by selecting an interactive element associated with the merchant that is presented via a user interface of the application. The user interface in this example is simplified through the use of interactive elements to select merchants. The merchant's website may be loaded to an in-app browser where the website is rendered as a web view within the application. In this web view, the user may browse and/or search for items offered for sale via the merchant's website, add an item(s) to a shopping cart or other order, and proceed to a checkout page or the like of the merchant's website where the user can purchase the item using one or more payment methods. In an example, because the merchant previously integrated a payment method associated with the application into their website (e.g., using a software development kit (SDK) or the like provided by the service provider), at least one of the payment methods made available to the user on the checkout page may be a payment method associated with the application and/or service provider. That is, one of the payment methods offered on the checkout page can be an option to use funds or other assets associated with an account the user has with the service provider (that is accessible via the application) to reduce the complexity of the system. If, while accessing the merchant's website via the in-app browser, the user selects this application-associated payment method, thereby requesting to initiate a payment to the merchant from the account associated with the application and/or service provider, a determination is made that the request originated from within the application. As a result of this determination, the payment is automatically authorized, and the user does not have to provide additional input between a time of requesting to initiate the payment and a time when the payment is authorized, which increases the security of the system as the user has been authenticated and authorized. Further, less processing power is required because the user associated with a user device does not need to be authenticated each time they use the application, thereby reducing the complexity of the system.

In some examples, a determination that a user's request to initiate a payment to the merchant originated from within the application is based at least in part on code (e.g., JavaScript code), data, or another signal, that the application provided to the in-app browser prior to the receipt of the request to initiate the payment to the merchant. In these examples, the presence of this provisioned (or "injected") code can be the basis for automating the authorization of the payment to the merchant without additional authorization requests (e.g., without additional input from the user in order to authorize the payment). In some examples, provisioning the above-mentioned code to the in-app browser creates a custom, secure communication channel that is used to send data directly to the application for performing a "silent authorization" without additional authorization requests, such as deep linking to another application, requesting an authorization code requiring additional input, sending an email or text message to request additional input, or the like.

The techniques, device, and systems described herein conserve resources with respect to processing resources, operating system resources, memory resources, networking resources, power resources, and/or other computing resources in the various ways described herein. For example, traditional approaches of authenticating a user by deep linking to other applications (e.g., switching applications and/or switching from a browser to an application) involve the use of operating system resources (e.g., the operating system may determine a target application to which an authentication procedure is to be delegated). By using the techniques described herein for performing actions (e.g., authorizing a payment from an account associated with an application on a third-party merchant website) without additional authorization requests, operating system resources and/or processing resources are conserved by freeing up operating system resources and/or processing resources to be utilized for other tasks. This is at least because the techniques described herein do not involve deep linking, and, therefore, the operating system does not have to parse data to determine a target application, as mentioned above. As another example, traditional approaches of using a one-time passcode (OTP), multi-factor authentication (MFA), and/or credentials (e.g., an electronic mail (email) address, phone number, username, and/or password) to authenticate a user involve the use of networking resources (e.g., by sending an OTP, a MFA message, and/or credentials over a network, such as the Internet). By using the techniques described herein for performing actions (e.g., authorizing a payment from an account associated with an application on a third-party merchant website) without additional authorization requests, networking resources are conserved at least because a network is not utilized to send data to, or receive data from, a user device to authenticate a user at a time of processing a payment request for the user.

The techniques, device, and systems described herein improve electronic payment security. As mentioned above, traditional approaches of authenticating a user by deep linking to other applications involve the use of operating system resources, such as an application providing data to the operating system, and the operating system parsing the data to determine a target application to which the authentication procedure is to be delegated. There is an inherent security risk associated with providing data to the operating system to deep link to another application. For example, provisioning data to the operating system subjects the data to theft by a nefarious actor who is able to exploit the operating system. By using the techniques described herein for performing actions (e.g., authorizing a payment from an account associated with an application on a third-party merchant website) without additional authorization requests, operating system resources are not utilized for deep linking to another application, and, therefore, data does not have to "leave" the application in order to authorize the payment, thereby improving electronic payment security.

The techniques, devices, and systems described herein improve a user's experience of making a payment on a merchant's website from an account associated with an application. Typically, when a user navigates to a merchant's website using a traditional browser (i.e., a browser that is not an "in-app" browser, but is instead outside of, and/or independent of, an application), and when the user subsequently attempts to purchase an item using a payment method associated with an application installed on their user device, the user is redirected from the traditional browser to the application via a deep link, and/or the user is asked to authenticate using an OTP, MFA, credentials, and/or similar authentication mechanisms. In contrast to these typical approaches, using the techniques, devices, and systems described herein, the user device refrains from switching applications on a user interface in response to a user of the device making a payment via an in-app browser; rather, the user device persistently renders the web view within the application whilst the user makes the payment via the in-app browser. This allows the user to make a payment via an in-app browser to a third party merchant using an application-associated account without the user being deep-linked to the application (e.g., without switching applications) to authenticate. Furthermore, the user device refrains from outputting (e.g., displaying) an OTP and an associated field to input the OTP, an MFA approval message, or a field(s) to input a credential(s). This allows the user to make the payment without having to authenticate using an OTP, MFA, credentials and/or similar authentication mechanisms after the payment is initiated. This provides an improved user experience at least because the user is not redirected away from an in-app shopping experience and/or because the user is not hassled with additional authorization requests while engaging in an in-app shopping experience in order to use an application-associated account to make a payment on a third party merchant's website. Further, the user device need not present multiple user interfaces via multiple resources (e.g., website to application to website and so on) to obtain authorization and/or otherwise process the payment. This provides an improvement over conventional techniques by conserving computing resources and reducing friction for users.

While several examples presented herein are directed to accessing a third-party merchant's website via an in-app browser within a payment application that is usable to make payments, the techniques described herein are also applicable to other types of actions and/or mobile/client applications that allow users to access third-party merchant websites from within the application. Examples of other types of applications include, but are not limited to, electronic commerce (ecommerce) applications, social networking applications, gaming applications, content (e.g., music, podcast and/or video) creation and/or streaming applications, or the like.

The preceding summary is provided for the purposes of summarizing some example embodiments to provide an understanding of aspects of the subject matter described herein. Accordingly, the above-described features are merely examples and should not be construed as limiting in any way. Other features, aspects, and advantages of the subject matter described herein will become apparent from the following description of the Figures and Claims.

FIG. 1 is an example environment 100 for performing actions without additional authorization requests, according to an implementation of the present subject matter. As depicted, the example environment 100 may include users, such as the user 102. The user 102 may be associated with a user device 104 (e.g., an electronic device). The user device 104 may be configured to execute an application 106 (sometimes referred to herein as an "app" 106, "mobile application/app" 106, or "client application/app" 106). The application 106 may represent any suitable type of application 106 including a payment application, an ecommerce applications, a social networking applications, a gaming applications, content (e.g., a music, podcast and/or video) creation and/or streaming applications, or the like. The application 106, when executing on the user device 104, may allow the user 102 to navigate to the various user interfaces described herein, and to interact with or access services, such as a payment service 108. In some examples, the user 102 can interact with the user interfaces of the application 106 to facilitate transactions (e.g., electronic payments) with other users and/or with merchants. In some examples, the application 106 allows two users (e.g., the user 102 and another user) who are "peers" to transfer funds in a "peer-to-peer (P2P)" transaction. In some examples, the application 106 allows a merchant and a customer of the merchant to transfer funds between each other, such as when the customer is purchasing an item(s) from the merchant. In at least one example, the application 106 allows for the efficient transfer of funds (e.g., fiat currency, securities (e.g., stocks, bonds, mutual funds), cryptocurrencies, gift cards, etc.) between users 102 and/or between customers of the payment service 108 and merchants associated with the payment service 108. Such transfers can be "efficient" in that they can happen electronically, in real-time or near real-time, due to a complex integration of software and hardware components configured to facilitate such transfers.

Although the application 106 may allow the user 102 to make payments using various payment instruments, including credit cards, debit cards, prepaid cards, and the like, there may be an account 110 associated with the application 106 that allows the user 102 to make payments using the application 106 without necessarily using a traditional payment instrument, such as a credit card, debit card, or the like, therefore increasing security because the physical card need not be present when the payment is being made. In other words, with the application-associated account 110, the user 102 can use the application 106 to make payments, in some examples, without having to enter information associated with a payment instrument, such as a credit card number, a debit card number, or the like, at a point-of-sale or online. In some examples, this application-associated account 110 is usable by opening the application 106 and scanning a code (e.g., a Quick Response (QR) code) at checkout, inputting a code, providing an identifier used in lieu of payment data, or the like, either at a point-of-sale or online. In some examples, when the account 110 is used to make a payment, a stored balance associated with the account 110 is accessed for withdrawing funds. The user 102 may not be required to have a linked bank account to use the account 110, in some examples. Instead, funds for payments made using the account 110 may be accessed from the aforementioned stored balance. If there are insufficient funds in the stored balance at a time at which the user 102 requests to use the account 110 to make a payment, a linked payment source (e.g., a linked debit card) of the user 102 may be accessed to fund at least a portion of the payment. A linked payment source may include an external account (e.g., bank account, payment instrument, etc.) associated with (e.g., linked to) the account 110, such as a linked debit card, a linked bank (e.g., checking) account, a linked credit card, a linked prepaid card, a linked gift card, etc. If there are no payment sources linked to the account 110, and if the stored balance does not cover the cost of a requested payment, the payment may be declined. That said, assuming funds are available in the stored balance, the application-associated account 110 is a quick and convenient way for the user 102 to make a payment (e.g., to purchase an item online or at a point-of-sale). As the payment is faster, the processing power is therefore reduced.

In some examples, the application 106 can be provided, and serviced, by one or more servers 112 associated with the payment service 108. For example, the payment service 108 may be associated with (e.g., affiliated) with the application 106 in that a service provider of the payment service 108 may also provide and service the application 106. In these examples, the user 102 may download and install a particular version of the application 106 on the user device 104 from the server(s) 112, either via a first time installation, a software update, or the like. In other examples, the application 106 may be provided, and serviced, by another entity (not shown in FIG. 1). In these examples, the service provider of the payment service 108 may be considered a third-party service provider with respect to the application 106. Nevertheless, the payment service 108, whether provided by a first-party service provider or a third-party service provider (with respect to the application 106), may be configured to approve payments made by the user 102 using the account 110 associated with the application 106.

FIG. 1 also depicts one or more servers 114 associated with a merchant website 116. For example, the server(s) 114 may represent a web server(s) 114 that is configured to serve web pages of the merchant website 116 to requesting user devices, such as the user device 104. In some examples, a merchant associated with the merchant website 116 may be considered a third-party merchant with respect to the application 106 and/or with respect to the payment service 108. Accordingly, the merchant website 116 is sometimes referred to herein as a third-party merchant website 116.

As depicted by FIG. 1, the user device 104, the server(s) 112, and the server(s) 114 may be communicatively coupled via one or more network(s) 118, such as a wide area network (WAN) (e.g., the Internet, a cellular network, etc.). In some examples, the server(s) 112 may include a cloud-based computing architecture suitable for hosting and servicing the application 106 executing on user devices, such as the user device 104. In particular examples, the server(s) 112 may include a Platform as a Service (PaaS) architecture, a Software as a Service (SaaS) architecture, an Infrastructure as a Service (IaaS), a Data as a Service (DaaS), a Compute as a Service (CaaS), or other similar cloud-based computing architecture (e.g., "X" as a Service (XaaS)). The server(s) 112 may be used to implement the aforementioned payment service 108, as described herein, in some examples using one or more components including, but not limited to an authentication component 128, a commerce component 130, an authorization component 132, a payment component 134, or the like.

The servers 112 may be configured to provide processing or computing support for the payment applications 106 executing on user devices, such as the user device 104. The servers 112 may have access to one or more data stores 120. The data store(s) 120 may include, for example, one or more internal data stores that may be utilized to store data (e.g., transaction data) associated with users and/or with merchants. As shown in FIG. 1, the data store(s) 120 may be used to maintain accounts associated with the application 106, such as the account(s) 110 of the user 102, as well as stored balances associated with the application-associated accounts 110. In some examples, the data store(s) may maintain identifiers and/or resource locators and/or credentials associated with external accounts (e.g., bank accounts, payment instruments, etc.) associated with (e.g., linked to) the account(s) 110 for selectively accessing the linked external account(s), as described herein, such as to withdraw funds therefrom.

In some examples, the server(s) 112 may represent a hosting and servicing platform for the applications 106 executing on the user devices 104. The user 102 may request to access the application 106 on the user device 104, such as by opening the application 106. Opening the application 106 may involve selecting an icon representing the application 106 from a home screen, or from a menu of installed applications, or the like. In some examples, when the user 102 requests to access the application 106, data is used (e.g., by the authentication component 128 of the payment service 108) to authenticate the user 102. The data used to authenticate the user 102 may include credentials (e.g., a username, password, etc.) provided by the user 102, biometric data (e.g., a fingerprint, voiceprint, etc.) associated with the user 102, and/or any other suitable user data. In some examples, the data used to authenticate the user 102 may include stored data (e.g., stored credentials) that was previously provided by the user 102. In some examples, the data used to authenticate the user 102 may include device data, such as a device identifier, an identifier of an installed application (e.g., the application 106), or the like. Upon successful authentication, the user 102 is authorized to use the account 110 associated with the application 106 for making payments. The data used to authenticate the user 102 may be stored in the datastore(s) 120 and/or on the user device 104, and the data may thereafter be accessible to the application 106 after the user 102 has authenticated for a first time (e.g., by entering credentials, such as a username and password, via the application 106). That is, after initially logging into the application 106, the application 106 and/or the authentication component 128 of the payment service 108 may automatically authenticate the user 102 using stored data (e.g., stored credentials) whenever the user 102 subsequently requests access to the application 106. This stored data may be encrypted for security purposes.

The application 106 may present various user interfaces, as will be described in more detail with respect to the following figures. In some examples, an interactive element associated with the merchant website 116, or that otherwise provisions access to the merchant website 116, is presented via a user interface of the application 106. Upon selection of the interactive element, the merchant website 116 (e.g., an ecommerce website) may load to an in-app browser 122 within the application 106, as shown in FIG. 1. This in-app browser 122 renders the merchant website 116 as a view within the application 106 (sometimes referred to herein as a "web view"). In this web view, the user 102 may browse and/or search for items offered for sale via the merchant's website 116, add an item(s) to a shopping cart, and proceed to a checkout page of the merchant's website 116 where the user 102 can purchase the item(s) using one or more payment methods. In some examples, the commerce component 130 of the payment service 108 is configured to provide the various user interfaces for accessing merchant profiles, websites (e.g., third-party merchant websites), or the like. As described below, in some examples, the merchant previously integrated a payment method associated with the application 106 into their website 116, and as such, at least one of the payment methods made available to the user 102 on the checkout page 124(1) may be the payment method associated with the application 106. For example, an interactive element 126 that allows the user 102 to pay the merchant using the account 110 associated with the application 106 may be presented on the checkout page 124(1) of the website 116 within the in-app browser 122. The presentation of the interactive element 126 on the checkout page 124(1) of the merchant's website 116 may be enabled by a web software development kit (SDK) 128 that is provided to the merchant for purposes of integrating the application-associated payment method into their website 116. In some examples, the merchant obtains the web SDK 128 from a service provider associated with the application 106 and/or a service provider associated with the payment service 108, which, in some examples, may be the same service provider. The web SDK 128 is shown as being stored in the data store(s) 130 accessible to the server(s) 114. In some examples, the data store(s) 130 maintains the code (e.g., JavaScript code) that is used to serve the website 116 to user devices, and the web SDK 128 code that is stored in the data store(s) 130 may represent additional code (e.g., JavaScript code) that is received by the in-app browser 122 from the server(s) 114 in order to present the interactive element 126 on the checkout page 124(1).

Selection of the interactive element 126 may be indicative of a request to initiate a payment to the merchant from the account 110 associated with the application 106. When the in-app browser 122 receives this request to initiate the payment from the account 110, a determination is made that the request originated from within the application 106, and based on this determination, the payment is authorized (e.g., by the authorization component 132 of the payment service 108) without additional input from the user 102. For example, FIG. 1 illustrates a second instance of the checkout page 124(2) that is rendered within the in-app browser 122 after the selection of the interactive element 126. In this example, an indication that the payment has been authorized is presented on the checkout page 124(2) based on the authorizing of the payment. This is merely an example, however, and other implementations may involve performing other actions responsive to the authorization of the payment, such as causing a checkout process to proceed via the website 116 within the in-app browser, or the like. Notably, in the various implementations described herein, the user 102 is not redirected away from an in-app shopping experience or hassled with additional authorization requests after selecting the interactive element 126 to request a payment using the account 110. Instead, the user 102 remains engaged in the in-app shopping experience due to the silent authorization that occurs after requesting to make the payment. Details regarding this silent authorization are discussed below with reference to the following figures. After the is authorized (e.g., by the authorization component 132), funds may be withdrawn (e.g., by the payment component 134 of the payment service 108) from a stored balance associated with the account 110 and/or from an external account associated with (e.g., linked to) the account 110 in order to make the payment to the merchant.

Figure 2:
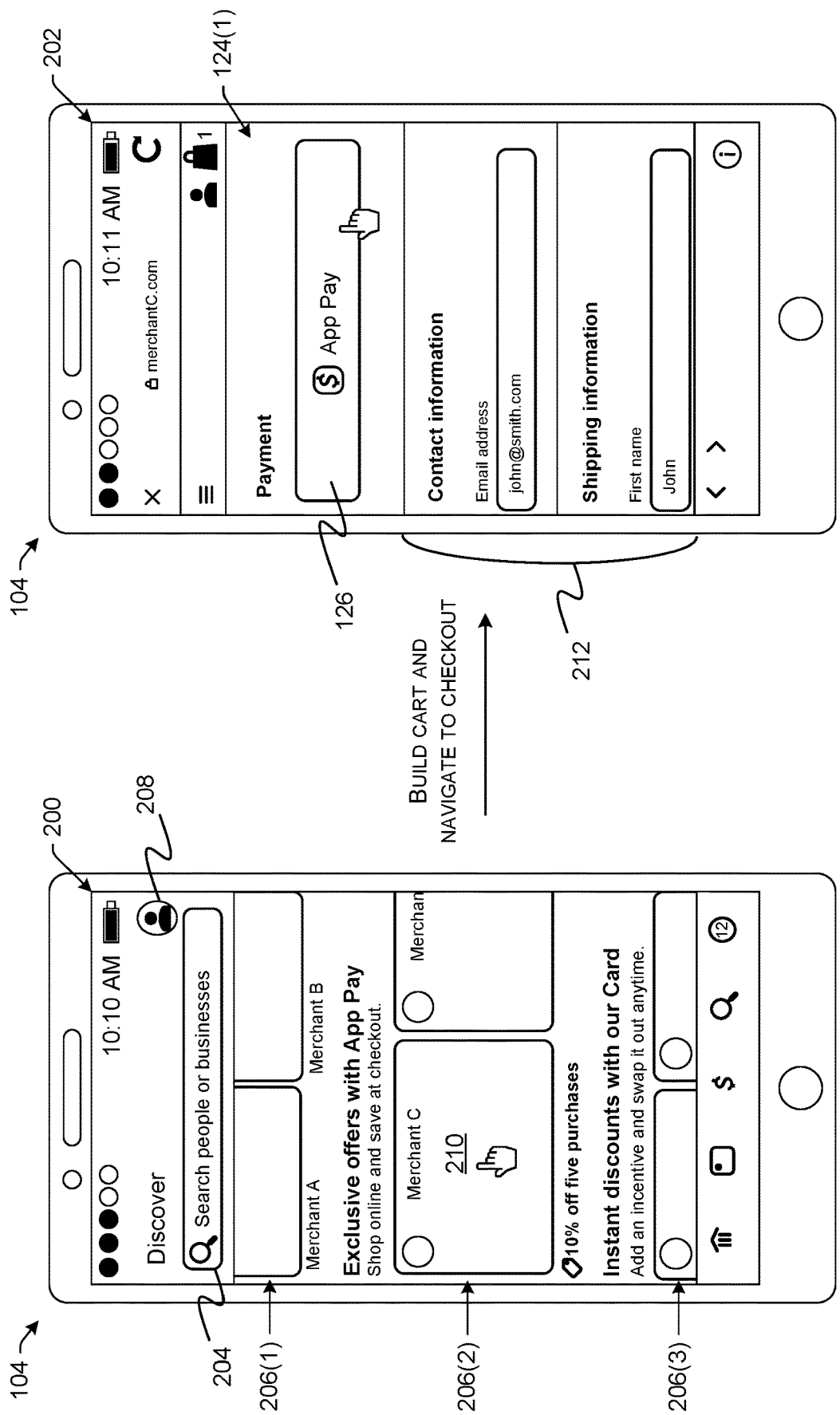
FIG. 2 illustrates example user interfaces for accessing a merchant's website via an in-app browser and for making a payment to the merchant via the in-app browser without additional authorization input, according to an implementation of the present subject matter.

FIG. 2 illustrates example user interfaces 200 and 202, according to an implementation of the present subject matter. In general, various user interfaces may be displayed via the application 106 while the application 106 is executing on a user's device 104. FIG. 2 shows the user device 104 of the user 102 at two instances of time. On the left of FIG. 2, at a first time, such as when the user 102 first opens (or launches) the application 106, the user device 104 displays a user interface 200 of the application 106. The user interface 200 includes one or more interactive elements with which the user 102 can interact (e.g., select via user input). For example, the user interface 200 may include an input element 204 (e.g., a search bar, search field, search entry box, etc.) via which the user 102 can provide user input to submit a search query, such as by selecting the input element 204 (e.g., via touch input) and subsequently typing a word or phrase. A virtual keyboard, or other input mechanism, may be presented in response to the user 102 selecting the input element 204, the virtual keyboard enabling the user 102 to type the word or phrase for the search query. The input element 204, prior to the user 102 typing the word or phrase, may include text (e.g., "Search people or businesses . . . ") to inform the user 102 as to what types of entities are searchable within the application 106. The user 102 may search for merchants (e.g., businesses) in this fashion, and may subsequently select a search result for accessing a merchant's website 116 via an in-app browser 122.

Other interactive elements presented in the example user interface 200 may include a one or more carousels 206 or other arrangements of interactive elements. The interactive elements may be tiles (e.g., rectangular user interface elements), buttons, etc. associated with merchants who are featured (or suggested, promoted, etc.). FIG. 2 depicts three different carousels 206(1), 206(2), and 206(3), each presented under a different promotional category (e.g., exclusive offers with App Pay, Instant discounts with our Card, etc.). In general, the merchants that are featured in the carousel(s) 206 may be merchants from whom the user 102 can purchase items during an in-app shopping experience (e.g., without being redirected to another application or another browser outside of the application 106). The individual carousels 206 may be interacted with by scrolling (e.g., touching and dragging a finger) left or right in order to reveal additional interactive elements of the carousel 206 that are off-screen and associated with additional merchants. Such interactive elements can be configured in additional or alternative configurations, for example, via a drop-down menu or other configuration.

In some examples, the user interface 200 may present an icon 208 indicating that the user 102 is logged into the application 106. This login may occur in the background whenever a user opens the application 106 after the user 102 has initially logged into the application 106 (e.g., using credentials, biometrics, etc.). For example, the application 106, when opened, may use data to authenticate the user 102 associated with the user device 104. Further, after logging in, and upon completing the authentication of the user 102, the user 102 may be authorized to use the account 110 associated with the application 106 to make payments.

The interactive elements (e.g., tiles) in each carousel 206 may be interacted with (e.g., selected) by the user 102 (e.g., touched with a finger) in order to navigate to an associated merchant's website that is to be presented via an in-app browser 122. FIG. 2 depicts an example where the interactive element 210 is presented via the user interface 200 of the application 106, and where the user 102 selects this interactive element 210 to access a merchant's website 116 via an in-app browser 122. The interactive element 210 is shown as a tile (e.g., a square tile) associated with a merchant. It is to be appreciated, however, that the interactive element 210 may be presented as any other suitable form, such as a link, a button, or the like, and that the interactive element 210 may be presented on any suitable user interface/page of the application 106, such as a search results page. Additionally, or alternatively, the interactive element 210 can be associated with any suitable type of entity, such as an incentive (e.g., a discount, coupon, loyalty points, cash back, roundup, purchase (e.g., of stock, bitcoin, etc.), etc.), a search result, a merchant profile page, or the like. In the example of FIG. 2, in response to a selection of the interactive element 210, the merchant website 116 may load to an in-app browser 122 within the application 106. In some examples, other user interface elements may be presented between selecting the interactive element 210 and loading the website 116 to an in-app browser 122. For example, a half sheet may pop-up on the user interface 200 in response to selection of the interactive element 210, the half sheet presenting a "shop now" button or a similar interactive element that, upon selection, navigates the user 102 to the merchant's website 116. In these examples, the half sheet may present a promotional message indicating that the user 102 will receive a discount for using the application-associated account 110 to purchase items on the merchant's website 116.

When the user 102 enters an in-app shopping experience, the merchant's website 116 is presented within a web view via the in-app browser 122. As such, the user 102 is not redirected away from the application 106. Instead, the user 102 remains within (or otherwise engaged with) the application 106 while the user 102 continues to browse and/or search for items on the merchant's website 116, which is presented within the in-app browser 122 (e.g., in a web view). The in-app browser 122 can be presented in the foreground of the display on the user device 104, in some examples. From the standpoint of the user 102, this may look like the in-app browser 122 is being rendered over (e.g., overlaying) the user interface 200 of the application 106 that was previously presented before selection of the interactive element 210, and, in this sense, the application 106, or portions thereof, if presented with the in-app browser 122 at all, may be presented around the periphery of the in-app browser 122, in the background, or the like. This may draw the user's 102 attention to the in-app browser 122, rather than the user interface of the application 106 itself.

In some examples, the user 102 is prevented from entering the in-app shopping experience unless and until the user 102 is authenticated. However, since the user 102 in the example of FIG. 2 is authenticated (as indicated by the icon 208), the user 102 is able to enter the in-app shopping experience on the merchant's website 116 after selecting the interactive element 210. Within the web view, the user 102 may add one or more items to a cart on the merchant's website 116 and may proceed to a checkout page on the merchant's website 116, all without leaving the web view within the application 106. This is indicated in FIG. 2 by the text "build cart and navigate to checkout" above the transition arrow.

On the right of FIG. 2, at a second time subsequent to the first time, the user interface 202 is presented on the user device 104 as a web view within the application 106. At this point in time, the user 102 has since added an item(s) to a cart on the merchant's website 116. In some examples, the user interface 202 may represent a web view of a checkout page 124(1) of the merchant's website 116, as discussed above with reference to FIG. 1. In this web view, the checkout page 124(1) may be scrollable in any suitable direction, such as vertically. The checkout page 124(1) presented within the user interface 202 may present the interactive element 126 introduced in FIG. 1, as well as various fields 212 for entering user information, such as contact information (e.g., an email address) and/or shipping information (e.g., first name, last name, shipping address, etc.) of the user 102. In some examples, the interactive element 126 may be presented based on the web SDK 128 code, which was also introduced in FIG. 1. In other words, because the merchant associated with the website 116 has integrated the web SDK 128 code into the website 116, and because the web SDK 128 code is associated with a payment method associated with the application 106, the web view loads the code (e.g., JavaScript code) associated with the web SDK 128 on the checkout page 124(1), which enables customers who shop on the website 116 to pay for items with the application-associated payment method (e.g., indicated as "App Pay" in FIG. 2). This means that, if the user 102 interacts with (e.g., selects) the interactive element 126, the user 102 is requesting to initiate a payment to the merchant from the account 110 associated with the application 106. For example, by selecting the interactive element 126, the user 102 is requesting to purchase the item(s) in the user's cart using, at least partially, funds withdrawn from a stored balance associated with the account 110 and/or from an external account associated with (e.g., linked to) the account 110. When the in-app browser 122 receives this request to initiate the payment from the account 110, a determination is made that the request originated from within the application 106, and based on this determination, the payment is authorized without additional input from the user 102, and funds may be withdrawn from a stored balance associated with the account 110 and/or from an external account associated with (e.g., linked to) the account 110 in order to make the payment to the merchant.

Figure 3:
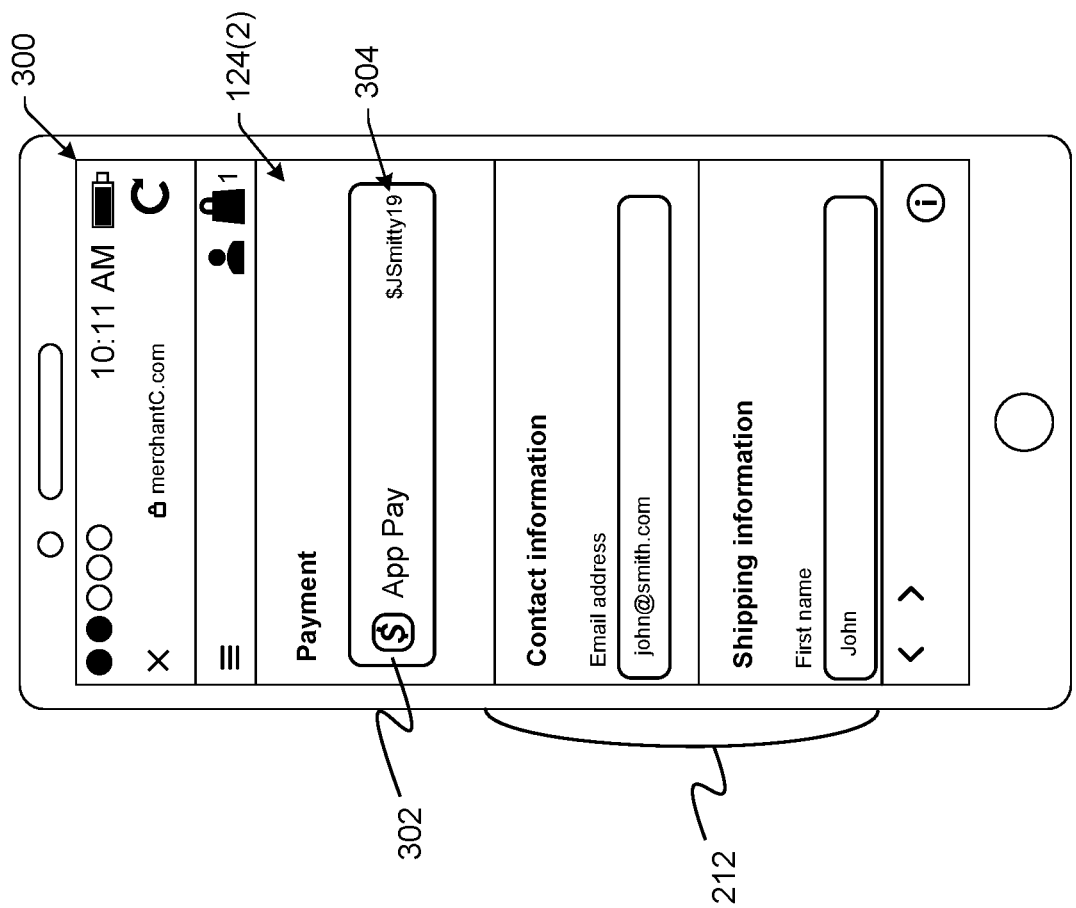
FIG. 3 is an example user interface presenting, within an in-app browser, an indication of an authorized payment on a checkout page of a merchant's website.

FIG. 3 is an example user interface 300 presenting, within an in-app browser 122, an indication 302 of an authorized payment on a checkout page 124(2) of a merchant's website 116. The user interface 300 may be presented in response to the user 102 selecting the interactive element 126 presented in the user interface 202 of FIG. 2. In this example, the interactive element 126 is changed into (or replaced with) the indication 302 in response to the user 102 selecting the interactive element 126 via the user interface 202. This indication 302 indicates, to the user 102, that the user's 102 payment was authorized. In some examples, the authorizing of the payment occurs without additional input from the user 102 of the device 104, as described herein, which, among other things, improves the user's 102 experience of making a payment on the merchant's website 116 using the account 110 associated with the application 106. As mentioned above, users who attempt to make payments on a merchant's website using an application-associated payment method would typically be redirected from a traditional browser or the merchant's mobile application to the application 106 via a deep link, and/or the user 102 would be asked to authenticate using an OTP, MFA, credentials, and/or similar authentication mechanisms. In contrast to these typical approaches, the user 102 of the device 104 shown in the examples of FIGS. 2 and 3 is able to make a payment via an in-app browser 122 to a third party merchant using an application-associated account 110 without the user 102 being deep-linked to the application (e.g., without switching applications) to authenticate and without the user 102 having to authenticate using an OTP, MFA, credentials and/or similar authentication mechanisms. Instead, the user 102 can remain engaged in the in-app shopping experience. As noted above, this "silent authorization" technique also conserves resources and improves electronic payment security due, at least in part, to the avoidance of deep linking to another application, as well as the avoidance of sending an OTP, an MFA approval message, or the like over a network before the payment is authorized.

In the example of FIG. 3, the indication 302 that the payment has been authorized is presented on the checkout page 124(2) of the website 116 within the in-app browser 122, and the indication 302 includes a user identifier 304 (e.g., a tag) associated with the user 102 to further indicate that the payment was successful in that the user's 102 account 110 was used to make the payment. In some examples, a message can be presented on the user interface 300 asking the user 102 to review the submitted information (e.g., the information submitted in the fields 212) to confirm that the information is correct before placing an order for the item(s). Alternatively, a transaction for the item(s) may be automatically approved and the order may be placed without user intervention following the selection of the interactive element 126. In this latter example, the user 102 may be able to review a receipt page presented within the in-app browser 122. In some examples, in response to the selection of the interactive element 126, a checkout process proceeds via the website 116 within the in-app browser 122, such as by the user entering additional information to complete the order for the item(s).

In some examples, because the transaction is taking place within the application 106, additional or alternative information associated with the user 102 can be accessed for further streamlining the checkout process. For instance, in some examples, user data associated with the account 110 can be accessed and used to automatically populate sizing information, shipping information, and/or other information used for fulfillment of the order. Further, in some examples, because the transaction originated from within the application 106, an incentive (e.g., discount, coupon, loyalty points, cashback, roundup, purchase (e.g., of stock, bitcoin, etc.), etc.) can be applied or otherwise associated with the transaction automatically or after a confirmation or user input indicating the user's desire to apply the incentive to the transaction.

The user interfaces 200, 202, and 300 are provided as examples of user interfaces that can be presented to facilitate techniques described herein. User interfaces can present additional or alternative data in additional or alternative configurations. That is, user interfaces 200, 202, and 300 should not be construed as limiting.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4A:
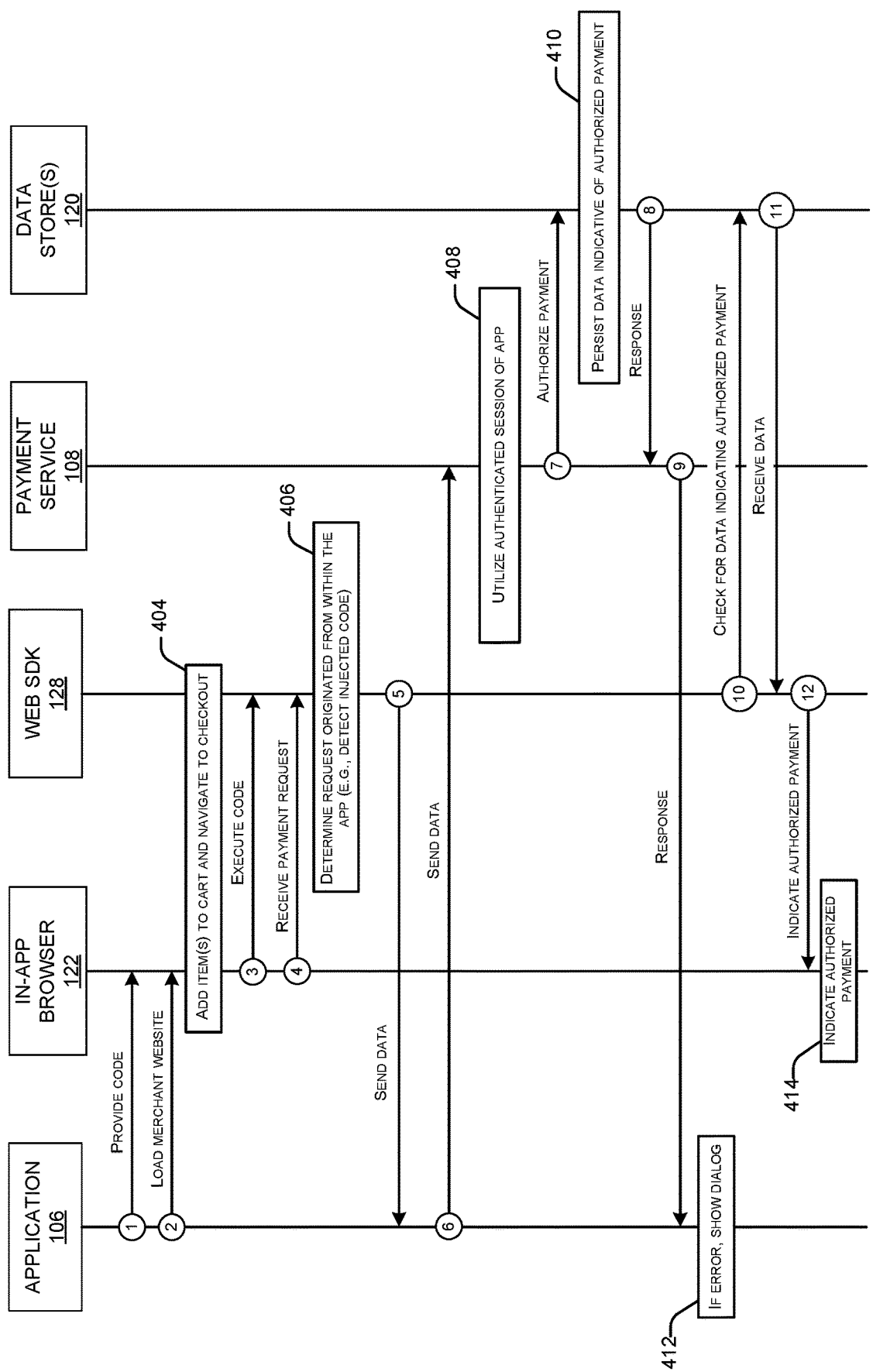

FIGS. 4A and 4B illustrate an example signal flow diagram for authorizing a payment without additional input from the user 102, the payment having been requested by a user 102 via an in-app browser 122, according to an implementation of the present subject matter. The components involved in the example signal flow diagram of FIGS. 4A and 4B include the application 106, the in-app browser 122, the web SDK 128 (which represents the code (e.g., JavaScript code) associated with the web SDK 128), the payment service 108, a data store(s) 120 accessible to the payment service 108, a merchant backend 400 (which may be the same as or similar to the server(s) 114 introduced in FIG. 1, and/or the merchant backend 400 may represent a backend system separate from the server(s) 114 yet associated with the merchant that is associated with the server(s) 114), and an application programming interface (API) 402.

As illustrated by the encircled number 1 in FIG. 4A, upon a user 102 opening the application 106 and subsequently engaging in an in-app shopping experience, the application 106 may provide (e.g., inject) code, data, or another signal to the in-app browser 112. For example, the application 106 may provide code, such as JavaScript code, to the in-app browser 122. This code may be provided to the in-app browser 122 at any suitable time prior to receiving a request from the user 102 to initiate a payment from the account 110 associated with the application 106. In some examples, the application 106 may provide the code to the in-app browser 122 in response to the user 102 selecting the interactive element 210 shown in FIG. 2. The presence of this "injected" code, data, or other signal can be the basis for automating the authorization of a payment to the merchant from the account 110 without additional authorization requests (e.g., without additional input from the user 102 in order to authorize the payment). In some examples, the application 106 provisioning the code to the in-app browser 122 opens a custom, secure communication channel (e.g., a channel to make and receive calls or other data transmissions), which is usable by the web SDK 128. In some examples, the application 106 provisioning the code to the in-app browser 122 causes a global object to be set on a window, and the web SDK 128 is configured to check for the global object in order to determine that a payment request originated from within the application 106, rather than from outside of the application 106 (e.g., via a traditional browser).

As illustrated by the encircled number 2 in FIG. 4A, the application 106 may cause a website 116 of a merchant to load to the in-app browser 122 within the application 106. Although FIG. 4A implies that the merchant website 116 is loaded to the in-app browser 122 after the application 106 provides the code to the in-app browser 122, this may not be the case in some examples. For example, the code may be provided by the application 106 to the in-app browser 122 in response to the merchant website 116 loading to the in-app browser 122 within the application 106. In some examples, the application 106 may provide the code to the in-app browser 122 at a time at which the web view of the website 116 opens. In some examples, the application 106 may cause the website 116 to load to the in-app browser 122 in response to the user 102 selecting the interactive element 210 shown in FIG. 2. In some examples, the operations associated with encircled numbers 1 and 2 in FIG. 4A occur in response to the user 102 selecting the interactive element 210 shown in FIG. 2, in any order relative to each other.

After the website 116 loads to the in-app browser 122, the user 102 may build a shopping cart on the merchant's website 116 by adding one or more items (e.g., goods, services, etc.) to the cart, and may navigate to a checkout page at 404. As illustrated by the encircled number 3 in FIG. 4A, the in-app browser 122 may execute code associated with the web SDK 128. This code may have been received from the server(s) 114 associated with the website 116. Executing the code associated with the web SDK 128 at the encircled number 3 in FIG. 4A may cause a checkout page 124(1) of the merchant's website 116 to present an interactive element 126 for using the account 110 associated with the application 106 to make a payment to the merchant.

As illustrated by the encircled number 4 in FIG. 4A, a request to initiate a payment to the merchant from an account 110 associated with the application 106 may be received via the in-app browser 122. In some examples, the in-app browser 122 may detect this payment request by executing the web SDK 128 code. The receipt of this payment request may be based on the user 102 selecting the interactive element 126 presented on the checkout page 124(1), for example, indicating the user's 102 request to make a payment (e.g., purchase the item(s)) using the account 110 associated with the application 106, as described herein.

At 406, a determination may be made, based at least in part on the request, that the request originated from within the application 106. This determination may be based at least in part on the code (e.g., JavaScript code), data, or another signal provided (e.g., injected) by the application 106 to the in-app browser 122 at the encircled number 1 in FIG. 4A. For example, the in-app browser 122 may execute the web SDK 128 code to detect the injected code at 406 and determine that the request originated from within the application 106. In some examples, at 406, the in-app browser 122 may execute the web SDK 128 code to determine that the global object has been set on the window to determine that the payment request originated from within the application 106, rather than from outside of the application 106 (e.g., via a traditional browser).

As illustrated by the encircled number 5 in FIG. 4A, instead of deep linking to another application, and instead of causing additional authorization requests (e.g., OTP, MFA, requests for credentials, etc.) to be made with respect to the user 102, the in-app browser 122 may cause data to be sent to the application 106 by executing code associated with the web SDK 128, such as web SDK 128 code received from the server(s) 114 associated with the website 116. In some examples, the web SDK 128 code executed by the in-app browser 122 at the encircled number 5 in FIG. 4A may utilize the above-mentioned custom, secure communication channel to the application 106 as a conduit of authentication (e.g., an authenticated conduit) to perform silent authorization for the payment request. For example, at the encircled number 5 in FIG. 4A, the in-app browser 122 may execute the web SDK 128 code to provide data to the application 106 directly, such as via the custom, secure communication channel established by the code data, or other signal provided (e.g., injected) by the application 106 to the in-app browser 122 at the encircled number 1 in FIG. 4A. In some examples, this data received by the application 106 at the encircled number 5 in FIG. 4A may be a deep link uniform resource locator (URL) payload that includes a request identifier (ID) associated with the user 102. This may serve as a payload of intent to make a payment using the user's account 110 associated with the application 106. In some examples, as an alternative to the example shown in FIG. 4A, the web SDK 128 (e.g., the code associated with the web SDK 128) may load after the user 102 has navigated to a checkout page 124(1) of the merchant's website 116 and may send the aforementioned data to the application 106, causing the application 106 to display a half sheet (e.g., a sheet associated with the application 106 that moves inward from an edge of the display of the user device 104 over the web view of the merchant's website 116) or the like to incentivize the user 102 to use the account 110 associated with the application 106 to make a payment to the merchant. In this alternative example, when the user 102 submits a payment request via the half sheet (e.g., by selecting an interactive element associated with the application-associated payment method), the application 106 may send (e.g., the payload) to the payment service 108.

With reference again to the example shown in FIG. 4A, as illustrated by the encircled number 6 in FIG. 4A, the application 106 may send the data (e.g., the payload) to the payment service 108 (e.g., to the server(s) 112, or backend computing system, associated with the payment service 108). In some examples, the data may be sent from the application 106 to the server(s) 112 using a HTTP POST method. In some examples, the application 106 is able to send data to, and/or receive data from, the server(s) 112 of the payment service 108 in an authenticated manner. For example, as described above, the payment service 108 may be provided by a first-party service provider with respect to the application 106 (e.g., the application 106 and the payment service 108 may be controlled, maintained, and/or serviced by a common entity). In other examples, the payment service 108 may be a third-party service provider with respect to the application 106 such that the application 106. In either case, the payment service 108, at 408, may utilize the authenticated session of the application 106 to process the data (e.g., payload) received from the application 106 for purposes of performing the silent authorization of the requested payment. In some examples, at the encircled number 6 in FIG. 4A, the data sent by the application 106 to the payment service 108 includes the deep link URL (e.g., without a payload), which may be sufficient for the payment service 108 to approve the payment by retrieving the user/customer request data using the deep link URL.

As illustrated by the encircled number 7 in FIG. 4A, the payment service 108 (e.g., the server(s) 112) may authorize the payment, such as by creating and approving a grant and by communicating with a data store(s) 120 (or with a service that has access to the data store(s) 120). At 410, data indicative of the authorized payment (e.g., grant details for the payment approval) may be persisted in the data store(s) 120, and as illustrated by the encircled number 8 in FIG. 4A, the data store(s) 120 (or a service with access thereto) may provide a response to the payment service 108 (e.g., the server(s) 112) indicating that the data indicative of the authorized payment (e.g., grant details) has been persisted. As illustrated by the encircled number 9 in FIG. 4A, the payment service 108 (e.g., the server(s) 112) may send a response to the application 106 indicating that the payment has been authorized (e.g., that the grant details have been persisted in the data store(s) 120). FIG. 4A also illustrates, at 412, that if the payment is not authorized due to an error (e.g., if the stored balance associated with the account 110 has insufficient funds to fund the payment, and, in some examples, if there is no external account (e.g., linked bank account, linked payment instrument, etc.) associated with (e.g., linked to) the account 110), the payment service 108 (e.g., the server(s) 112) may send an error message (e.g., non-200 status message) to the application 106, and a dialogue (e.g., a message) may be presented via a user interface of the application 106, such as via a pop-up notification, a banner notification, etc. This dialogue may indicate to the user 102 that an error has occurred with the user's 102 payment request. The example of FIGS. 4A and 4B assumes that the payment is authorized, however, and the following operations are performed as a result of the authorization.

As illustrated by the encircled number 10 in FIG. 4A, the web SDK 128 code is executed (e.g., by the in-app browser 122) to periodically poll the data store(s) 120 for the data indicative of the authorized payment (e.g., grant details). In some examples, the web SDK 128 code is executed to poll the data store(s) 120 every second, every few seconds, every several milliseconds, or at any other suitable frequency to determine if the data (e.g., grant details) is available (e.g., from the data store(s) 120). In some examples, the web SDK 128 code is executed to make a call to an API to check for the data (e.g., grant details) within the data store(s) 120. As illustrated by the encircled number 11 in FIG. 4A, the web SDK 128 code being executed (e.g., by the in-app browser 122) may receive the data (e.g., the approved grant details) from the data store(s) 120, such as via an API, thereby confirming that the payment has been authorized.

As illustrated by the encircled number 12 in FIG. 4A, the web SDK 128 code may be executed to provide an indication of the authorized payment (e.g., "customer_request_approved") to the in-app browser 122. In some examples, the web SDK 128 code is executed at the encircled number 12 in FIG. 4A in order to validate and process the grant, which ultimately notifies the merchant associated with the website 116 of a success. The indication of the authorized payment provided at the encircled number 12 in FIG. 4A may serve as a notification to the in-app browser 122 regarding the authorized payment. At 414, the in-app browser 122 may indicate the authorized payment. In some examples, at 414, the in-app browser 122 causes an indication 302 that the payment has been authorized to be presented on a checkout page 124(2) of the website 116 within the in-app browser 122, as illustrated in the user interface 300 of FIG. 3. For example, the identifier 304 (e.g., tag) of the user may be presented within the indicator 302 on the checkout page 124(2). As another example, at 414, the in-app browser 122 causes a checkout process to proceed via the website 116 within the in-app browser 122.

As illustrated by the encircled number 13 in FIG. 4B, the in-app browser 122 may send data (e.g., createPayment (customerRequest.grant)) to the merchant backend 400 indicating that the payment has been authorized. The merchant backend 400 may represent a backend computing system associated with the merchant who is associated with the website 116. As illustrated by the encircled number 14 in FIG. 4B, the merchant backend 400 may make a call using the API 402 to create (e.g., complete) the payment (e.g., createPayment(customerRequest.grant)), which causes the API 402 to create a payment (e.g., apply an incentive and create a payment) by accessing the data store(s) 120, as illustrated by the encircled number 15 in FIG. 4B. The API 402 may represent an authenticated API utilized by the merchant backend 400 to access the data store(s) 120. For example, funds may be withdrawn from a stored balance associated with the account 110 associated with the application 106 and/or from an external account associated with (e.g., linked to) the account 110 in order to make the payment to the merchant from the account 110. If an incentive(s) applies, for example, the incentive(s) is/are automatically applied with respect to the request ID associated with the user 102, and, as illustrated by the encircled number 16 in FIG. 4B, a call is made to make the payment to the merchant via the API 402. In some examples, any applicable incentive(s) (e.g., discount(s)) is/are credited to the account 110, and the net amount of funds is withdrawn from the stored balance associated with the account 110 after the incentive(s) (e.g., discount(s)) is/are applied. This may be accomplished using a ledgering service of the payment service 108. The net amount of funds may be withdrawn from the stored balance, if available, and/or from a linked external account, such as a linked payment instrument (e.g., a linked debit card, credit card, etc.), a linked bank (e.g., checking) account, or the like, if the stored balance does not have sufficient funds to withdraw the net amount. As illustrated by the encircled number 17 in FIG. 4B, the payment is made (e.g., settled with) the merchant by applying the payment, in some examples with an incentive(s) applied, via the API 402 to the merchant backend 400, and any incentive(s) (e.g., discount(s)) credited to the user's account 110 may be subsidized by the payment service 108 to transfer the entire amount of the payment to the merchant backend 400.

Figure 5:
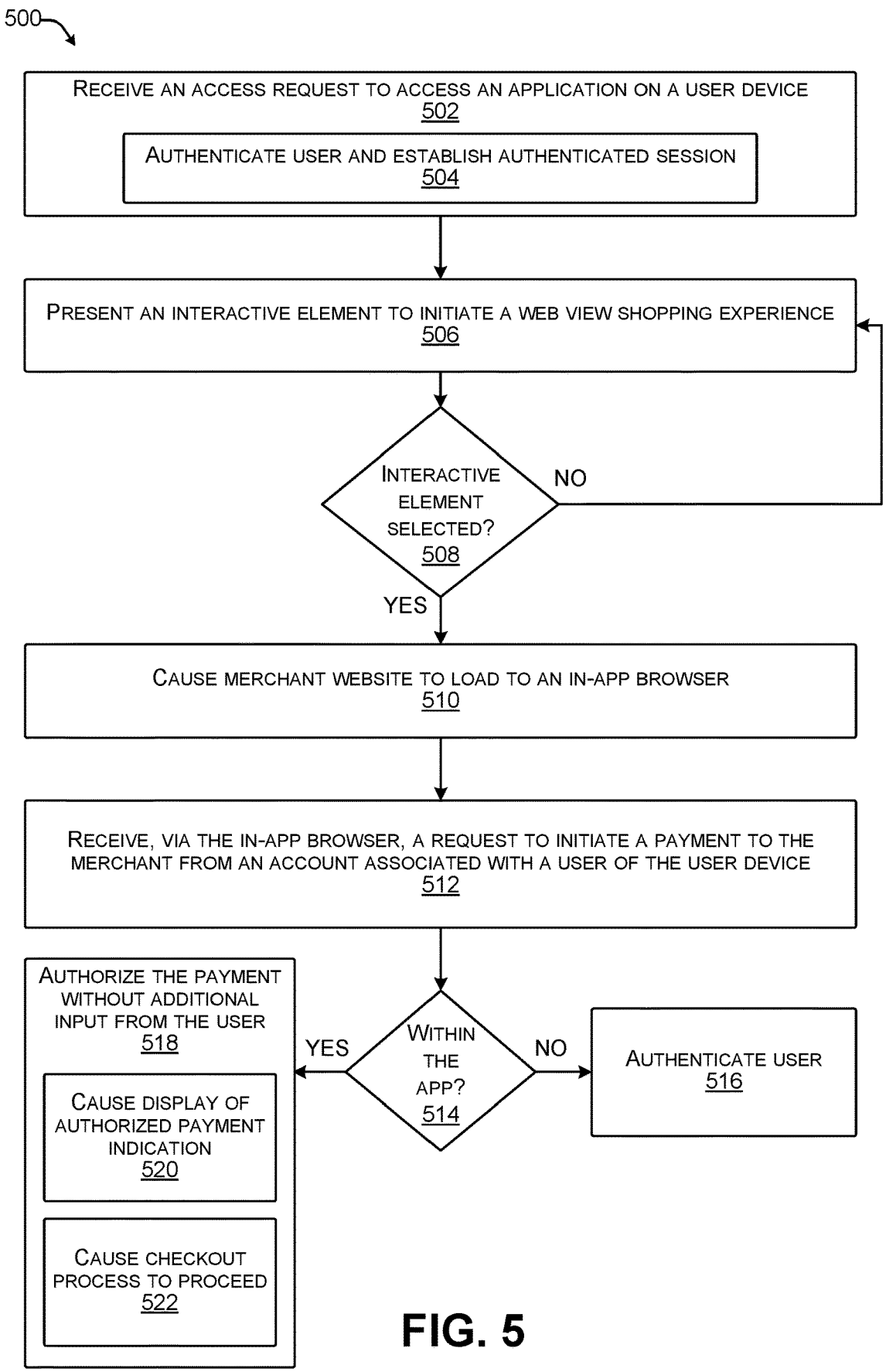
FIG. 5 is an example process for authorizing a payment without additional authorization input from the user, the payment having been requested by a user via an in-app browser, according to an implementation of the present subject matter.

FIG. 5 is an example process 500 for authorizing a payment that was requested by a user 102 via an in-app browser 122 without additional input from the user 102, according to an implementation of the present subject matter. The process 500 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process 500. The process 500 can be implemented by a system including one or more processors and memory storing computer-executable instructions to cause the one or more processors to perform the process 500. In some examples, the process 500 can be implemented by a user device 104 (and/or by a processor(s) of the user device 104), by a server(s) 112 (and/or by a processor(s) of the server(s) 112), or a combination thereof. For discussion purposes, the process 500 is described with reference to the previous figures.

At 502, an access request is received, wherein the access request is a request to access an application 106 on a user device 104. In some examples, the user device 104 (e.g., a processor(s) thereof) may receive the access request at block 502. In some examples, the server(s) 112 (e.g., a processor(s) thereof) may receive the access request from the user device 104 at block 502. In some examples, the user 102 may provide, and the user device 104 may receive, user input indicative of the access request. For example, the user 102 may provide touch input to the user device 104 requesting access to the application 106. For example, the user 102 may open the application 106 on the user device 104 by selecting an icon representing the application 106 from a home screen, from a menu of installed applications, or the like. In some examples, the application 106 is a payment application that is usable to make payments (e.g., to merchants, to other users, etc.).

In some examples, at 504, the access request is associated with data to authenticate the user 102 associated with the user device 104. That is, the user 102 may be authenticated based at least in part on the access request received at block 502. For example, when the user 102 requests to access the application 106, data is used to authenticate the user 102, wherein, upon authentication the user 102 is authorized to use the account 110 associated with the application 106 for making payments. This data used to authenticate the user 102 at block 504 may be stored on the user device 104 and thereafter accessible to the application 106 after the user 102 has authenticated for a first time (e.g., by entering credentials, such as a username and password, via the application 106). That is, after initially logging into the application 106, the application may automatically authenticate the user 102 using stored data (e.g., stored credentials) whenever the user 102 subsequently requests access to the application 106.

At 506, an interactive element 210 is presented via a user interface 200 of the application 106. In some examples, the user device 104 (e.g., a processor(s) thereof, the application 106 executing on the user device 104, etc.) may present the interactive element 210 at block 506. In some examples, the server(s) 112 (e.g., a processor(s) thereof) may cause the interactive element 210 to be presented via the user interface 200 at block 506. In some examples, selection of the interactive element 210 presented at block 506 may cause a website 116 of a merchant to load to an in-app browser 122 within the application 106. In some examples, the loading of the website 116 to the in-app browser 122 initiates a web view shopping experience.

At 508, a determination is made as to whether the interactive element 210 has been selected. In some examples, the user device 104 (e.g., a processor(s) thereof) may make the determination at block 508. In some examples, the server(s) 112 (e.g., a processor(s) thereof) may make the determination at block 508. For example, the user device 104 may make the determination at block 508 based on touch data corresponding to touch input received via the display of the user device 104 in association with the interactive element 210. In some examples, the server(s) 112 can make the determination at block 508 based on receipt of the touch data from the user device 104. If the interactive element 210 is not selected at block 508, the process 500 may follow the NO route from block 508 back to block 506, where the interactive element 506 continues to be presented via the user interface 200 unless the user 102 closes the application 106 or navigates away from the user interface 200 without selecting the interactive element 210. If it is determined that the interactive element 210 has been selected at block 508, the process 500 may follow the YES route from block 508 to block 510.

At 510, a website 116 of a merchant may be loaded to an in-app browser 122 within the application 106. In some examples, the user device 104 (e.g., a processor(s) thereof) may cause the website 116 to be loaded to the in-app browser 122 at block 510. In some examples, the server(s) 112 (e.g., a processor(s) thereof) may cause the website 116 to be loaded to the in-app browser 122 at block 510. In some examples, the website 116 is an ecommerce website where items (e.g., goods, services, etc.) of a merchant are available for purchase. In some examples, the user 102 may browse and/or search for items and may add one or more items to a cart on the website 116 via the in-app browser 122.

At 512, a request to initiate a payment to the merchant from an account 110 associated with the application 106 is received via the in-app browser 122. In some examples, the user device 104 (e.g., a processor(s) thereof) may receive the request to initiate the payment at block 512. In some examples, the server(s) 112 (e.g., a processor(s) thereof) may receive the request to initiate the payment at block 512. In some example, the user device 104 may receive the request to initiate the payment at block 512 based on touch data corresponding to touch input received via the display of the user device 104 in association with an interactive element 126. In some examples, the server(s) 112 may receive the request to initiate the payment at block 512 based on receipt of the touch data from the user device 104.

At 514, a determination is made, based at least in part on the request received at block 512, as to whether the request originated from within the application 106. In some examples, the user device 104 (e.g., a processor(s) thereof, the in-app browser 122 executing on the user device 104, etc.) may make the determination at block 514. In some examples, the server(s) 112 (e.g., a processor(s) thereof) may make the determination at block 514. In some examples, the determination at block 514 is based on whether code (e.g., JavaScript code), data, or another signal was provided (e.g., injected) by the application 106 to the in-app browser 122, as described herein, such as illustrated by the encircled number 1 in FIG. 4A. In other words, the determination at block 514 may be based on a detection of the code previously provided by the application 106 to the in-app browser 122 prior to receiving the request at block 512, as illustrated at 406 of the signal flow diagram in FIG. 4A. In some examples, at 514, the web SDK 128 determines whether a global object has been set on the window to determine whether the payment request originated from within the application 106. If the request received at block 512 did not originate from within the application (e.g., if the application 106 did not provide code to the in-app browser 122 prior to receiving the request at block 512), the process 500 may follow the NO route from block 514 to block 516, where the user 102 may be authenticated. For example, if the user 102 happens to exit the application 106 and navigate to the merchant's website 116 via a traditional browser (e.g., a browser that is not an in-app browser) and subsequently makes a request to pay the merchant (e.g., to purchase an item(s) in the user's cart) using the account 110 associated with the application 106, the user may be deep-linked to the application 106 to authenticate. If, on the other hand, it is determined, at 514, that the request received at block 512 originated from within the application 106 (e.g., if the in-app browser 122 previously received code from the application 106, and/or the global object is set on the window), the process 500 may follow the YES route from block 514 to block 518.

At 518, the payment is authorized without additional input from the user 102 based at least in part on the determination in the affirmative at block 514. In some examples, the user device 104 (e.g., a processor(s) thereof, the application 106 executing on the user device 104, etc.) may cause the payment to be authorized at block 518. In some examples, the server(s) 112 (e.g., a processor(s) thereof) may authorize the payment at block 518, such as by receiving data from the user device 104 and using an authenticated session of the application 106. The signal flow diagram of FIGS. 4A and 4B provides an example of operations that may be performed to authorize the payment without additional authorization requests with respect to the user 102, such as the operations from the encircled number 5 in FIG. 4A to any subsequent operation up to the encircled number 17 in FIG. 4B. For example, based at least in part on the in-app browser 122 executing the web SDK 128 code received from the web server(s) 114 associated with the website 116, the application 106 may receive data (e.g., a deep link URL payload that includes a request ID associated with the user 102, and the application 106 may send this data to the backend computing system (e.g., server(s) 112) of the payment service 108 such that the authorization at block 518 is based at least in part on the data initially received by the application 106 and subsequently forwarded to the backend system of the payment service 108. In some examples, the authorizing of the payment at block 518 is based on the data associated with the access request received at block 502. That is, the data used to authenticate the user 102, such as stored credentials (e.g., a username, password, etc.) at block 504 may be used to authorize the payment at block 518. In this case, the user 102 was authenticated even before the user 102 engaged in the web view shopping experience, which means that the authorization of the payment can be a "silent" authorization without additional authorization requests (e.g., without additional input from the user 102). For example, the payment may be authorized automatically without the user 102 having to provide input to another application launched on the user device 104 based on a deep link after submitting the payment request, without the user 102 having to enter an OTP via the user device 104 after submitting the payment request, without the user 102 having to provide MFA input via the user device 104 after submitting the payment request, and without the user 102 having to enter credentials via the user device 104 after submitting the payment request.

In some examples, at 520 an indication 302 that the payment has been authorized may be presented on a checkout page 124(2) of the website 116 within the in-app browser 122 based at least in part on the authorizing at block 518. FIG. 3 illustrates an example of this indication 302, which may include user identifier 304 (e.g., a tag) associated with the user 102 to further indicate that the payment was successful in that the user's 102 account 110 was used to make the payment. In some examples, the user device 104 (e.g., a processor(s) thereof) may cause the indication 302 to be presented on the checkout page 124(2) at block 520. In some examples, the server(s) 112 (e.g., a processor(s) thereof) may cause the indication 320 to be presented on the checkout page 124(2) at block 520. For example, the indication 302 may be presented at 414, as illustrated in the signal flow diagram of FIG. 4A.

In some examples, at 522 a checkout process may proceed via the website 116 within the in-app browser 122 based at least in part on the authorizing at block 518. In some examples, the user device 104 (e.g., a processor(s) thereof) may cause the checkout process to proceed at block 522. In some examples, the server(s) 112 (e.g., a processor(s) thereof) may cause the checkout process to proceed at block 522. For example, the checkout process may proceed at 414, as illustrated in the signal flow diagram of FIG. 4A. In some examples, causing the checkout process to proceed includes proceeding to a next step of a checkout process, such as entering user information requested by the website 116 in order to complete an order.

By implementing the process 500, the user 102, upon requesting to initiate a payment (e.g., in response to the receiving of the request at block 512), is not redirected away from an in-app shopping experience in order to use an application-associated account 110 to make a payment on a third party merchant's website 116 from within the application 106. The user 102 is also not hassled with additional authorization requests while engaging in the in-app shopping experience in order to use an application-associated account 110 to make such a payment. As noted above, the process 500 conserves resources with respect to at least operating system resources and networking resources because traditional deep linking and other authentication procedures are avoided. Furthermore, the process 500 improves the security of electronic payments through the avoidance of traditional deep linking, as described herein.

Figure 6:
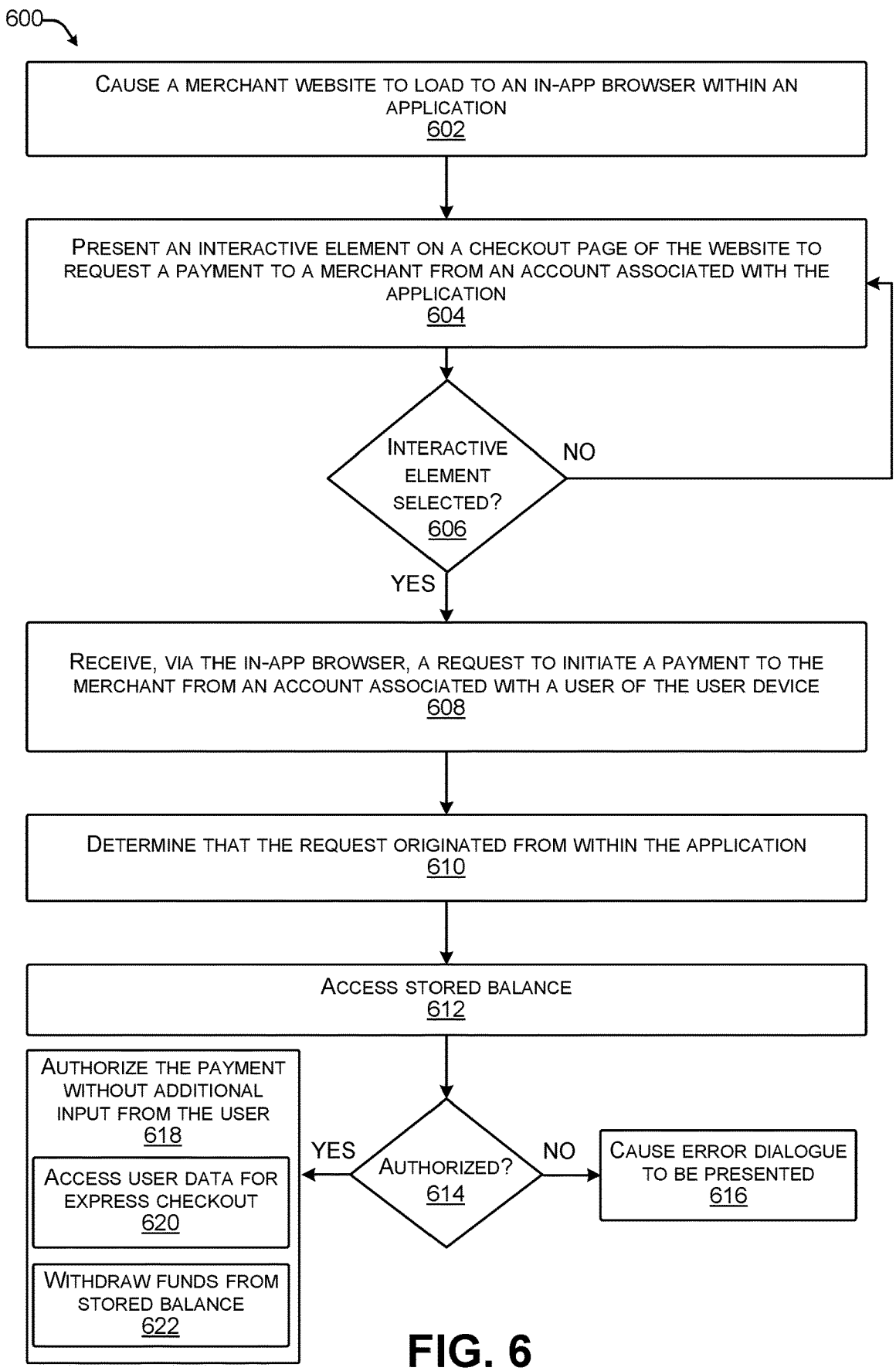
FIG. 6 is an example process for determining whether to authorize a payment requested via an in-app browser, according to an implementation of the present subject matter.

FIG. 6 is an example process 600 for determining whether to authorize a payment requested via an in-app browser 122, according to an implementation of the present subject matter. The process 600 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. The order in which the operations are described is not intended to be construed as a limitation, and any number of the described blocks can be combined in any order and/or in parallel to implement the process 600. The process 600 can be implemented by a system including one or more processors and memory storing computer-executable instructions to cause the one or more processors to perform the process 600. In some examples, the process 600 can be implemented by a user device 104 (and/or by a processor(s) of the user device 104), by a server(s) 112 (and/or by a processor(s) of the server(s) 112), or a combination thereof. For discussion purposes, the process 600 is described with reference to the previous figures.

At 602, a website 116 of a merchant may be loaded to an in-app browser 122 within an application 106. In some examples, the user device 104 (e.g., a processor(s) thereof) may cause the website 116 to be loaded to the in-app browser 122 at block 602. In some examples, the server(s) 112 (e.g., a processor(s) thereof) may cause the website 116 to be loaded to the in-app browser 122 at block 602. In some examples, the website 116 is an ecommerce website where items (e.g., goods, services, etc.) of a merchant are available for purchase. In some examples, the user 102 may browse and/or search for items and may add one or more items to a cart on the website 116 via the in-app browser 122.

At 604, an interactive element 126 is presented on the merchant website 116 within the in-app browser 122. In some examples, the web SDK 128 code received from the server(s) 114 associated with the website 116 may cause the user device 104 (e.g., a processor(s) thereof) to present the interactive element 126 within the in-app browser 122 at block 604. In some examples, the interactive element 126 may indicate via text (e.g., "App Pay") that selection of the interactive element 126 may initiate a request to pay the merchant from the account 110 associated with the application 106.

At 606, a determination is made as to whether the interactive element 126 has been selected. In some examples, the user device 104 (e.g., a processor(s) thereof) may make the determination at block 606. In some examples, the server(s) 112 (e.g., a processor(s) thereof) may make the determination at block 606. For example, the user device 104 may make the determination at block 606 based on touch data corresponding to touch input received via the display of the user device 104 in association with the interactive element 126. In some examples, the server(s) 112 can make the determination at block 606 based on receipt of the touch data from the user device 104. If the interactive element 126 is not selected at block 606, the process 600 may follow the NO route from block 606 back to block 604, where the interactive element 126 continues to be presented on the merchant website 116 within the in-app browser 122 unless the user 102 closes the application 106 or navigates away from the web view of the merchant website 116 without selecting the interactive element 126. If it is determined that the interactive element 126 has been selected at block 606, the process 600 may follow the YES route from block 606 to block 608.

At 608, a request to initiate a payment to the merchant from the account 110 associated with the application 106 is received via the in-app browser 122. In some examples, the user device 104 (e.g., a processor(s) thereof) may receive the request to initiate the payment at block 608. In some examples, the server(s) 112 (e.g., a processor(s) thereof) may receive the request to initiate the payment at block 608. In some example, the user device 104 may receive the request to initiate the payment at block 608 based on touch data corresponding to touch input received via the display of the user device 104 in association with an interactive element 126. In some examples, the server(s) 112 may receive the request to initiate the payment at block 608 based on receipt of the touch data from the user device 104.

At 610, a determination is made, based at least in part on the request received at block 608, that the request originated from within the application 106. In some examples, the user device 104 (e.g., a processor(s) thereof) may make the determination at block 610. In some examples, the server(s) 112 (e.g., a processor(s) thereof) may make the determination at block 610. In some examples, the determination at block 610 is based on code (e.g., JavaScript code), data, or another signal having been provided (e.g., injected) by the application 106 to the in-app browser 122, as described herein, such as illustrated by the encircled number 1 in FIG. 4A. In other words, the determination at block 610 may be based on a detection of the code previously provided by the application 106 to the in-app browser 122 prior to receiving the request at block 608, as illustrated at 406 of the signal flow diagram in FIG. 4A. In some examples, at 610, the web SDK 128 determines that a global object has been set on the window to determine that the payment request originated from within the application 106.

At 612, a stored balance associated with the account 110 of the user 102 for withdrawing funds for payment to the merchant is accessed. In some examples, the user device 104 (e.g., a processor(s) thereof) may access the stored balance at block 612, such as if the stored balance was cached in the local memory of the user device 104 upon authenticating the user 102 when the user 102 opened the application 106. In some examples, the user device 104 (e.g., a processor(s) thereof, the application 106 executing on the user device 104, etc.) may cause the server(s) 112 to access, and the server(s) 112 (e.g., a processor(s) thereof) may thereby access, the stored balance at block 612, such as by accessing the stored balance from the data store(s) 120.

At 614, a determination is made as to whether to authorize the payment based at least in part on the stored balance accessed at block 612. In some examples, the user device 104 (e.g., a processor(s) thereof) may make the determination at block 614. In some examples, the server(s) 112 (e.g., a processor(s) thereof) may make the determination at block 614. The determination made at block 614 may be based at least in part on a determination of an amount of funds in the stored balance. In some examples, such a determination may include determining whether an incentive(s) is available, whether the stored balance indicates positive funds, and if so, an amount of the positive funds, and/or whether there is a linked external account, such as a linked payment instrument (e.g., a debit card, a credit card, a prepaid card, a gift card, etc.), a linked bank (e.g., checking) account, or the like associated with the account 110. If the payment is not authorized at block 614, the process 600 may follow the NO route from block 614 to block 616, where an error dialogue is presented via a user interface of the user device 104. For example, a pop-up notification, a banner notification, or the like may be presented via the application 106 (e.g., within the in-app browser 122) indicating that the payment has been rejected due to an error (e.g., insufficient funds in the stored balance of the account 110 and/or an unavailability of a linked external account, such as a linked payment instrument, etc.). If the determination at block 614 is that the payment is authorized, the process 600 may follow the YES route from block 614 to block 618.

At 618, the payment is authorized without additional input from the user 102 based at least in part on the determination that the request originated from within the application 106 and based at least in part on funds being available in the stored balance and/or from an external account associated with (e.g., linked to) the account 110 to finance the payment. In some examples, the user device 104 (e.g., a processor(s) thereof) may cause the payment to be authorized at block 618. In some examples, the server(s) 112 (e.g., a processor(s) thereof) may authorize the payment at block 618, such as by receiving data from the user device 104 and using an authenticated session of the application 106. The signal flow diagram of FIGS. 4A and 4B provides an example of operations that may be performed to authorize the payment without additional authorization requests with respect to the user 102, such as the operations from the encircled number 5 in FIG. 4A to any subsequent operation up to the encircled number 17 in FIG. 4B. For example, based at least in part on the in-app browser 122 executing the web SDK 128 code received from the web server(s) 114 associated with the website 116, the application 106 may receive data (e.g., a deep link URL payload that includes a request ID associated with the user 102, and the application 106 may send this data to the backend computing system (e.g., server(s) 112) of the payment service 108 such that the authorization at block 618 is based at least in part on the data initially received by the application 106 and subsequently forwarded to the backend system of the payment service 108. In some examples, a "silent" authorization without additional authorization requests (e.g., without additional input from the user 102) performed at block 618 involves automatically authorizing the payment without the user 102 having to provide input to another application launched on the user device 104 based on a deep link after submitting the payment request, without the user 102 having to enter an OTP via the user device 104 after submitting the payment request, without the user 102 having to provide MFA input via the user device 104 after submitting the payment request, and without the user 102 having to enter credentials via the user device 104 after submitting the payment request.

In some examples, at 620 user data associated with the user 102 may be accessed, and a checkout process may be completed, without user intervention, via the website 116 based at least in part on the user data. In other words, an express checkout may be enabled through the access and subsequent utilization of user data to complete a checkout process automatically on behalf of the user. This user data may include a full name of the user 102, an email address associated with the user 102, phone number associated with the user 102, a shipping address associated with the user 102, and/or any other suitable user data that may be used to complete an order and/or to complete a checkout process. In some examples, the user device 104 (e.g., a processor(s) thereof) may access the user data and may cause the checkout process to be completed, without user intervention, via the website 116 based at least in part on the user data at block 620. In some examples, the server(s) 112 (e.g., a processor(s) thereof) may access the user data and may cause the checkout process to be completed, without user intervention, via the website 116 based at least in part on the user data at block 620.

In some examples, at 622 funds can be withdrawn from the stored balance associated with the account 110 so that the funds can be used to make the payment to the merchant. In some examples, the user device 104 (e.g., a processor(s) thereof) may cause the server(s) 112 to withdraw the funds from the stored balance associated with the account 110 at block 622. In some examples, the server(s) 112 (e.g., a processor(s) thereof) may withdraw the funds from the stored balance associated with the account 110 at block 622. In some examples, funds may be withdrawn from the stored balance associated with the account 110 and/or from an external account associated with (e.g., linked to) the account 110. Accordingly, the authorizing of the payment may include accessing the stored balance associated with the account 110 of the user 102 and/or from an external account associated with (e.g., linked to) the account 110 for withdrawing funds for payment to the merchant, and through the access of the user data at block 620, an express, one-click checkout can be implemented to allow the user 102 to complete a transaction (e.g., to complete an order for an item(s)) with the merchant by selecting the interactive element 126 and without additional user input.

Figure 7:
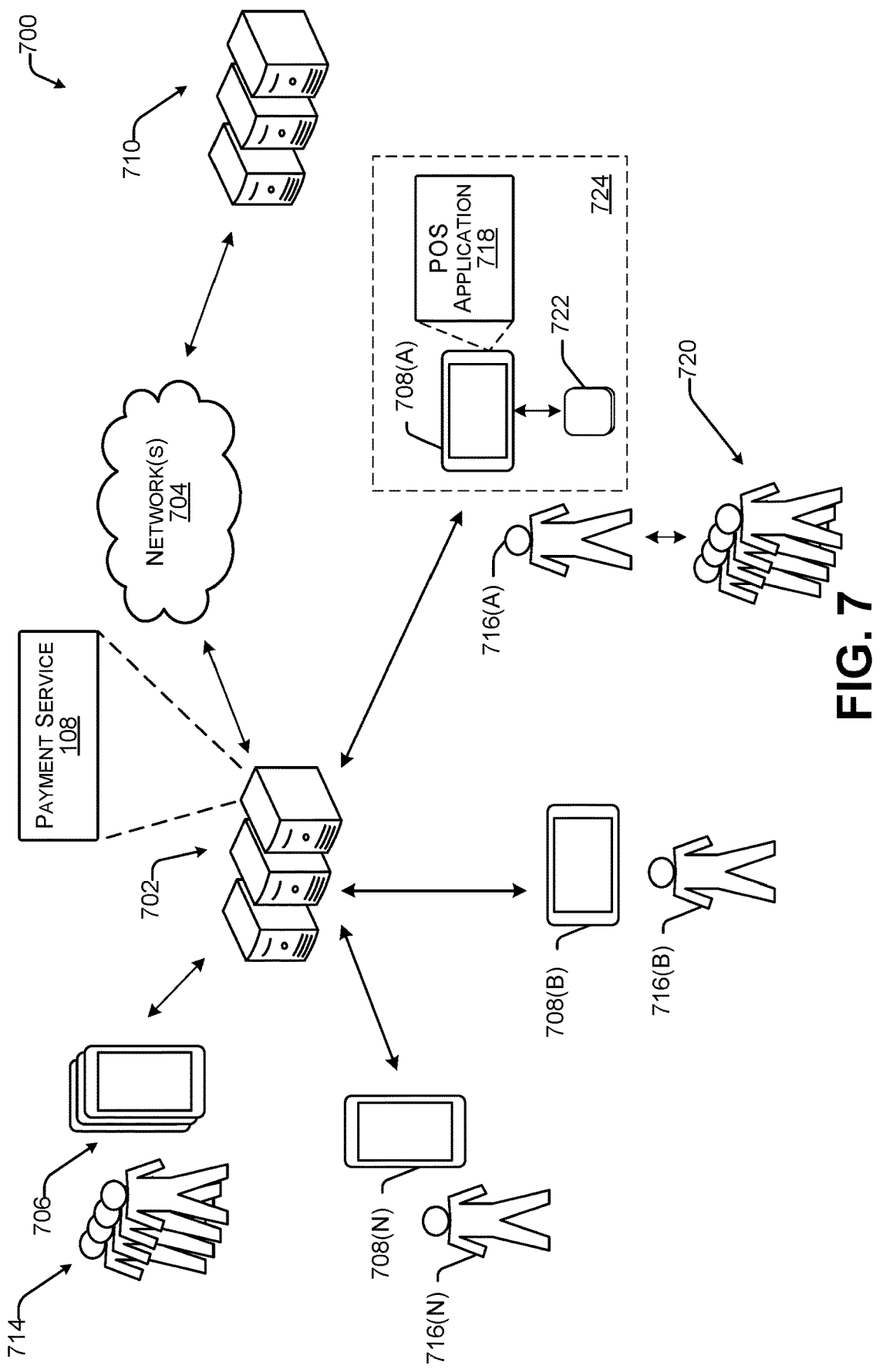
FIG. 7 is an example environment for performing techniques described herein.

FIG. 7 is an example environment 700 for performing techniques described herein. The environment 700 includes server(s) 702 that can communicate over a network 704 with user devices 706 (which, in some examples can be merchant devices 708 (individually, 708(A)-708(N))) and/or server(s) 710 associated with third-party service provider(s). The server(s) 702 can be associated with a service provider that can provide one or more services for the benefit of users 714, as described below. Actions attributed to the service provider can be performed by the server(s) 702.

For example, the server(s) 702 may be the same as or similar to the server(s) 112 introduced in FIG. 1, and the server(s) 702 may implement the payment service 108, which may implement some of the techniques described herein. Furthermore, the network(s) 704 may be the same as or similar to the network(s) 118 introduced in FIG. 1.

The environment 700 can include a plurality of user devices 706, as described above. Each one of the plurality of user devices 706 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. The individual user devices 706 (and in some examples, the merchant devices 708) may be the same as or similar to the user device 104 introduced in FIG. 1. In some examples, individual ones of the user devices can be operable by users 714. The users 714 can be referred to as customers, buyers, merchants, sellers, borrowers, employees, employers, payors, payees, couriers and so on. The users 714 can interact with the user devices 706 via user interfaces presented via the user devices 706. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 706 can have an instance or versioned instance of an application, which can be downloaded from an application store, for example, which can present the user interface(s) described herein. In at least one example, a user 714 can interact with the user interface via touch input, spoken input, or any other type of input.

In accordance with the examples described herein, an access request may be received from a user device 706 to access an application 106. For instance, the server(s) 702 may receive the access request from the user device 706. An interactive element 210 may then be presented via a user interface of the application 106 (e.g., on the user device 706). For instance, the user device 706 may cause the application 106 to present the interactive element 210 via a user interface 200 of the application 106. The interactive element 210, when selected, may cause a website 116 of a merchant 716 to load to an in-app browser 122 within the application 106. A request may then be received via the in-app browser 122, the request being a request to initiate a payment to the merchant 716 from an account 110 associated with the application 106. For instance, the user device 706 executing the in-app browser 122 within the application 106 may receive the request, and/or the server(s) 702 may receive the request to initiate the payment. Based at least in part on the request, a determination may be made that the request originated from within the application 106. For instance, the user device 706 executing the in-app browser 122 may determine the origin of the request as being from within the application 106, and/or the server(s) 702 may determine the origin of the request as being from within the application 106. Based at least in part on determining that the request originated from within the application 106, the payment may be authorized without additional input from a user 714 associated with the user device 706. For instance, the user device 706 may cause the payment to be authorized by sending data to the payment service 108 (e.g., the server(s) 702), and/or the server(s) 702 may authorize the payment, as described herein.

As described above, in at least one example, the users 714 can include merchants 716 (individually, 716(A)-716(N)). The individual users 714 may be the same as or similar to the user 102 introduced in FIG. 1, and the merchants 716 may be associated with websites that are the same as or similar to the website 116 introduced in FIG. 1. In an example, the merchants 716 can operate respective merchant devices 708, which can be user devices 706 configured for use by merchants 716. For the purpose of this discussion, a "merchant" can be any entity that offers items (e.g., goods or services) for purchase or other means of acquisition (e.g., rent, borrow, barter, etc.). The merchants 716 can offer items for purchase or other means of acquisition via brick-and-mortar stores, mobile stores (e.g., pop-up shops, food trucks, etc.), online stores, combinations of the foregoing, and so forth. In some examples, at least some of the merchants 716 can be associated with a same entity but can have different merchant locations and/or can have franchise/franchisee relationships. In additional or alternative examples, the merchants 716 can be different merchants. That is, in at least one example, the merchant 716(A) is a different merchant than the merchant 716(B) and/or the merchant 716(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 708 can have an instance of a POS application 718 stored thereon. The POS application 718 can configure the merchant device 708 as a POS terminal, which enables the merchant 716(A) to interact with one or more customers 720. As described above, the users 714 can include customers, such as the customers 720 shown as interacting with the merchant 716(A). For the purpose of this discussion, a "customer" can be any entity that acquires items from merchants. While only two customers 720 are illustrated in FIG. 7, any number of customers 720 can interact with the merchants 716. Further, while FIG. 7 illustrates the customers 720 interacting with the merchant 716(A), the customers 720 can interact with any of the merchants 716.

In at least one example, interactions between the customers 720 and the merchants 716 that involve the exchange of funds (from the customers 720) for items (from the merchants 716) can be referred to as "transactions." In at least one example, the POS application 718 can determine transaction data associated with the POS transactions. Transaction data can include payment information, which can be obtained from a reader device 722 associated with the merchant device 708(A), user authentication data, purchase amount information, point-of-purchase information (e.g., item(s) purchased, date of purchase, time of purchase, etc.), etc. The POS application 718 can send transaction data to the server(s) 702 such that the server(s) 702 can track transactions of the customers 720, merchants 716, and/or any of the users 714 over time. Furthermore, the POS application 718 can present a UI to enable the merchant 716(A) to interact with the POS application 718 and/or the service provider via the POS application 718.

In at least one example, the merchant device 708(A) can be a special-purpose computing device configured as a POS terminal (via the execution of the POS application 718). In at least one example, the POS terminal may be connected to a reader device 722, which is capable of accepting a variety of payment instruments, such as credit cards, debit cards, gift cards, short-range communication based payment instruments, and the like, as described below. In at least one example, the reader device 722 can plug in to a port in the merchant device 708(A), such as a microphone port, a headphone port, an audio-jack, a data port, or other suitable port. In additional or alternative examples, the reader device 722 can be coupled to the merchant device 708(A) via another wired or wireless connection, such as via a Bluetooth®, BLE, and so on. Additional details are described below with reference to FIG. 11. In some examples, the reader device 722 can read information from alternative payment instruments including, but not limited to, wristbands and the like.

In some examples, the reader device 722 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 722, and communicate with the server(s) 702, which can provide, among other services, a payment processing service. The server(s) 702 associated with the service provider can communicate with server(s) 710, as described below. In this manner, the POS terminal and reader device 722 may collectively process transaction(s) between the merchants 716 and customers 720. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 722 of the POS system 724 are shown as separate devices, in additional or alternative examples, the POS terminal and the reader device 722 can be part of a single device. In some examples, the reader device 722 can have a display integrated therein for presenting information to the customers 720. In additional or alternative examples, the POS terminal can have a display integrated therein for presenting information to the customers 720. POS systems, such as the POS system 724, may be mobile, such that POS terminals and reader devices may process transactions in disparate locations across the world. POS systems can be used for processing card-present transactions and card-not-present (CNP) transactions, as described below.

A card-present transaction is a transaction where both a customer 720 and his or her payment instrument are physically present at the time of the transaction. Card-present transactions may be processed by swipes, dips, taps, or any other interaction between a physical payment instrument (e.g., a card), or otherwise present payment instrument, and a reader device 722 whereby the reader device 722 is able to obtain payment data from the payment instrument. A swipe is a card-present transaction where a customer 720 slides a card, or other payment instrument, having a magnetic strip through a reader device 722 that captures payment data contained in the magnetic strip. A dip is a card-present transaction where a customer 720 inserts a payment instrument having an embedded microchip (i.e., chip) into a reader device 722 first. The dipped payment instrument remains in the payment reader until the reader device 722 prompts the customer 720 to remove the card, or other payment instrument. While the payment instrument is in the reader device 722, the microchip can create a one-time code which is sent from the POS system 724 to the server(s) 710 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 720 may tap or hover his or her payment instrument (e.g., card, electronic device such as a smart phone running a payment application, etc.) over a reader device 722 to complete a transaction via short-range communication (e.g., NFC, RFID, Bluetooth®, BLE, etc.). Short-range communication enables the payment instrument to exchange information with the reader device 722. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 724, the server(s) 702, and/or the server(s) 710 may exchange payment information and transaction data to determine whether transactions are authorized. For example, the POS system 724 may provide encrypted payment data, user authentication data, purchase amount information, point-of-purchase information, etc. (collectively, transaction data) to server(s) 702 over the network(s) 704. The server(s) 702 may send the transaction data to the server(s) 710. As described above, in at least one example, the server(s) 710 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 710 associated therewith)

can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 710 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 710 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 710 associated therewith), and a payment authorization message is communicated from the issuer to the POS device via a path opposite of that described above, or via an alternate path.

As described above, the server(s) 710, which can be associated with payment service provider(s), may determine whether the transaction is authorized based on the transaction data, as well as information relating to parties to the transaction (e.g., the customer 720 and/or the merchant 716(A)). The server(s) 710 may send an authorization notification over the network(s) 704 to the server(s) 702, which may send the authorization notification to the POS system 724 over the network(s) 704 to indicate whether the transaction is authorized. The server(s) 702 may also transmit additional information such as transaction identifiers to the POS system 724. In one example, the server(s) 702 may include a merchant application and/or other functional components for communicating with the POS system 724 and/or the server(s) 710 to authorize or decline transactions.

Based on the authentication notification that is received by the POS system 724 from server(s) 702, the merchant 716(A) may indicate to the customer 720 whether the transaction has been approved. In some examples, approval may be indicated at the POS system 724, for example, at a display of the POS system 724. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 714 can access all of the services of the service provider. In other examples, the users 714 can have gradated access to the services, which can be based on risk tolerance, IDV outputs, subscriptions, and so on. In at least one example, access to such services can be availed to the merchants 716 via the POS application 718. In additional or alternative examples, each service can be associated with its own access point (e.g., application, web browser, etc.).

The service provider can offer payment processing services for processing payments on behalf of the merchants 716, as described above. For example, the service provider can provision payment processing software, payment processing hardware and/or payment processing services to merchants 716, as described above, to enable the merchants 716 to receive payments from the customers 720 when conducting POS transactions with the customers 720. For instance, the service provider can enable the merchants 716 to receive cash payments, payment card payments, and/or electronic payments from customers 720 for POS transactions and the service provider can process transactions on behalf of the merchants 716.

As the service provider processes transactions on behalf of the merchants 716, the service provider can maintain accounts or balances for the merchants 716 in one or more ledgers. For example, the service provider can analyze transaction data received for a transaction to determine an amount of funds owed to a merchant 716(A) for the transaction. In at least one example, such an amount can be a total purchase price less fees charged by the service provider for providing the payment processing services. Based on determining the amount of funds owed to the merchant 716(A), the service provider can deposit funds into an account of the merchant 716(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 716(A) to a bank account of the merchant 716(A) that is held at a bank or other financial institution (e.g., associated with the server(s) 710). Scheduled deposits can occur at a prearranged time after a POS transaction is funded, which can be a business day after the POS transaction occurred, or sooner or later. In some examples, the merchant 716(A) can access funds prior to a scheduled deposit. For instance, the merchant 716(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 716(A) can have a payment instrument that is linked to the stored balance that enables the merchant to access the funds without first transferring the funds from the account managed by the service provider to the bank account of the merchant 716(A).

In at least one example, the service provider may provide inventory management services. That is, the service provider may provide inventory tracking and reporting. Inventory management services may enable the merchant 716(A) to access and manage a database storing data associated with a quantity of each item that the merchant 716(A) has available (i.e., an inventory). Furthermore, in at least one example, the service provider can provide catalog management services to enable the merchant 716(A) to maintain a catalog, which can be a database storing data associated with items that the merchant 716(A) has available for acquisition (i.e., catalog management services). In at least one example, the catalog may include a plurality of data items and a data item of the plurality of data items may represent an item that the merchant 716(A) has available for acquisition. The service provider can offer recommendations related to pricing of the items, placement of items on the catalog, and multi-party fulfilment of the inventory.

In at least one example, the service provider can provide business banking services, which allow the merchant 716(A) to track deposits (from payment processing and/or other sources of funds) into an account of the merchant 716(A), payroll payments from the account (e.g., payments to employees of the merchant 716(A)), payments to other merchants (e.g., business-to-business) directly from the account or from a linked debit card, withdrawals made via scheduled deposit and/or instant deposit, etc. Furthermore, the business banking services can enable the merchant 716(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 716 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 716. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 714 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 716. In at least one example, the service provider can recommend and/or generate content items to supplement omni-channel presences of the merchants 716. That is, if a merchant of the merchants 716 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 714 to set schedules for scheduling appointments and/or users 714 to schedule appointments.

In some examples, the service provider can provide restaurant management services to enable users 714 to make and/or manage reservations, to monitor front-of-house and/or back-of-house operations, and so on. In such examples, the merchant device(s) 708 and/or server(s) 702 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 714 who can travel between locations to perform services for a requesting user 714 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 706.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 714, voice inputs into a virtual assistant or the like, to determine intents of user(s) 714. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 714 may be new to the service provider such that the user 714 that has not registered (e.g., subscribed to receive access to one or more services offered by the service provider) with the service provider. The service provider can offer onboarding services for registering a potential user 714 with the service provider. In some examples, onboarding can involve presenting various questions, prompts, and the like to a potential user 714 to obtain information that can be used to generate a profile for the potential user 714. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 714 providing all necessary information, the potential user 714 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 710). That is, the service provider can offer IDV services to verify the identity of users 714 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 714 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 710 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 702) and/or the server(s) 710 via the network(s) 704. In some examples, the merchant device(s) 708 are not capable of connecting with the service provider (e.g., the server(s) 702) and/or the server(s) 710, due to a network connectivity issue, for example. In additional or alternative examples, the server(s) 702 are not capable of communicating with the server(s) 710 due to network connectivity issue, for example. In such examples, devices may operate in "offline" mode where at least some payment data is stored (e.g., on the merchant device(s) 708) and/or the server(s) 702 until connectivity is restored and the payment data can be transmitted to the server(s) 702 and/or the server(s) 710 for processing.

In at least one example, the service provider can be associated with a hub, such as an order hub, an inventory hub, a fulfillment hub and so on, which can enable integration with one or more additional service providers (e.g., associated with the additional server(s) 710). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 706 that are in communication with one or more server computing devices 702 of the service provider. That is, techniques described herein are directed to a specific implementation—or, a practical application—of utilizing a distributed system of user devices 706 that are in communication with one or more server computing devices 702 of the service provider to perform a variety of services, as described above. The unconventional configuration of the distributed system described herein enables the server(s) 702 that are remotely-located from end-users (e.g., users 714) to intelligently offer services based on aggregated data associated with the end-users, such as the users 714 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 714 and user devices 706. Furthermore, such features are changed dynamically based on the profiles of the users involved interacting with the GUIs. As such, techniques described herein are directed to improvements to computing systems.

Figure 8:
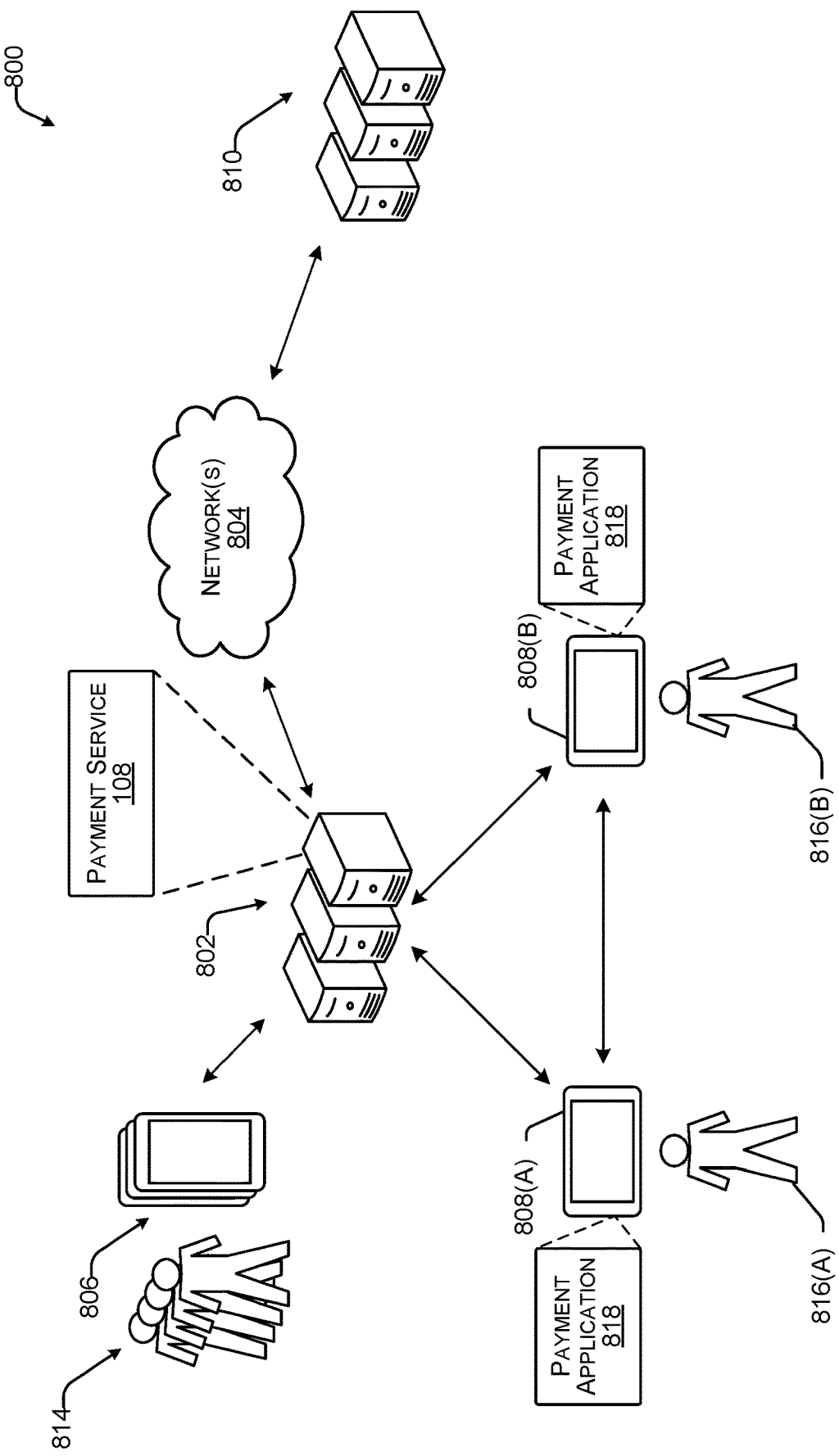
FIG. 8 is an example environment for performing techniques described herein.

FIG. 8 is an example environment 800 for performing techniques described herein. The environment 800 includes server(s) 802 that can communicate over a network 804 with user devices 806 (which, in some examples can be user devices 808 (individually, 808(A), 808(B)) and/or server(s)) 810 associated with third-party service provider(s). The server(s) 802 can be associated with a service provider that can provide one or more services for the benefit of users 814, as described below. Actions attributed to the service provider can be performed by the server(s) 802. In some examples, the service provider referenced in FIG. 7 can be the same or different than the service provider referenced in FIG. 8.

For example, the server(s) 802 may be the same as or similar to the server(s) 112 introduced in FIG. 1, and the server(s) 802 may implement the payment service 108, which may implement some of the techniques described herein. Furthermore, the network(s) 804 may be the same as or similar to the network(s) 118 introduced in FIG. 1.

The environment 800 can include a plurality of user devices 806, as described above. Each one of the plurality of user devices 806 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. The individual user devices 806 (and in some examples, the individual user devices 808) may be the same as or similar to the user device 104 introduced in FIG. 1. In some examples, individual ones of the user devices can be operable by users 814. The users 814 can be referred to as customers, buyers, merchants, sellers, borrowers, employees, employers, payors, payees, couriers and so on. The users 814 can interact with the user devices 806 via user interfaces presented via the user devices 806. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 806 can have an instance or versioned instance of an application, which can be downloaded from an application store, for example, which can present the user interface(s) described herein. In at least one example, a user 814 can interact with the user interface via touch input, spoken input, or any other type of input.

In at least one example, the service provider can provide a peer-to-peer payment service that enables peer-to-peer payments between two or more users 814. Two users, user 816(A) and user 816(B) are illustrated in FIG. 8 as "peers" in a peer-to-peer payment. In at least one example, the service provider can communicate with instances of a payment application 818 (or other access point) installed on devices 806 configured for operation by users 814. In an example, an instance of the payment application 818 executing on a first device 808(A) operated by a payor (e.g., user 816(A)) can send a request to the service provider to transfer an asset (e.g., fiat currency, non-fiat currency, cryptocurrency, securities, gift cards, and/or related assets) from the payor to a payee (e.g., user 816(B)) via a peer-to-peer payment. In some examples, assets associated with an account of the payor are transferred to an account of the payee. In some examples, assets can be held at least temporarily in an account of the service provider prior to transferring the assets to the account of the payee. The individual users 814 (and in some examples, the individual users 816) may be the same as or similar to the user 102 introduced in FIG. 1, and the payment application 818 may be the same as or similar to the application 106 introduced in FIG. 1.

In accordance with the examples described herein, an access request may be received from a user device 808 to access an application 106 (e.g., the payment application 818). For instance, the server(s) 802 may receive the access request from the user device 808. An interactive element 210 may then be presented via a user interface of the application 106 (e.g., the payment application 818). For instance, the user device 808 may cause the application 106 (e.g., the payment application 818) to present the interactive element 210 via a user interface 200 of the application 106 (e.g., the payment application 818). The interactive element 210, when selected, may cause a website 116 of a merchant to load to an in-app browser 122 within the application 106 (e.g., the payment application 818). A request may then be received via the in-app browser 122, the request being a request to initiate a payment to the merchant from an account 110 associated with the application 106 (e.g., the payment application 818). For instance, the user device 808 executing the in-app browser 122 within the application 106 (e.g., the payment application 818) may receive the request, and/or the server(s) 802 may receive the request to initiate the payment. Based at least in part on the request, a determination may be made that the request originated from within the application 106 (e.g., the payment application 818). For instance, the user device 808 executing the in-app browser 122 may determine the origin of the request as being from within the application 106 (e.g., the payment application 818), and/or the server(s) 802 may determine the origin of the request as being from within the application 106 (e.g., the payment application 818). Based at least in part on determining that the request originated from within the application 106 (e.g., the payment application 818), the payment may be authorized without additional input from a user 816 associated with the user device 808. For instance, the user device 808 may cause the payment to be authorized by sending data to the payment service 108 (e.g., the server(s) 802), and/or the server(s) 802 may authorize the payment, as described herein.

Figure 9:
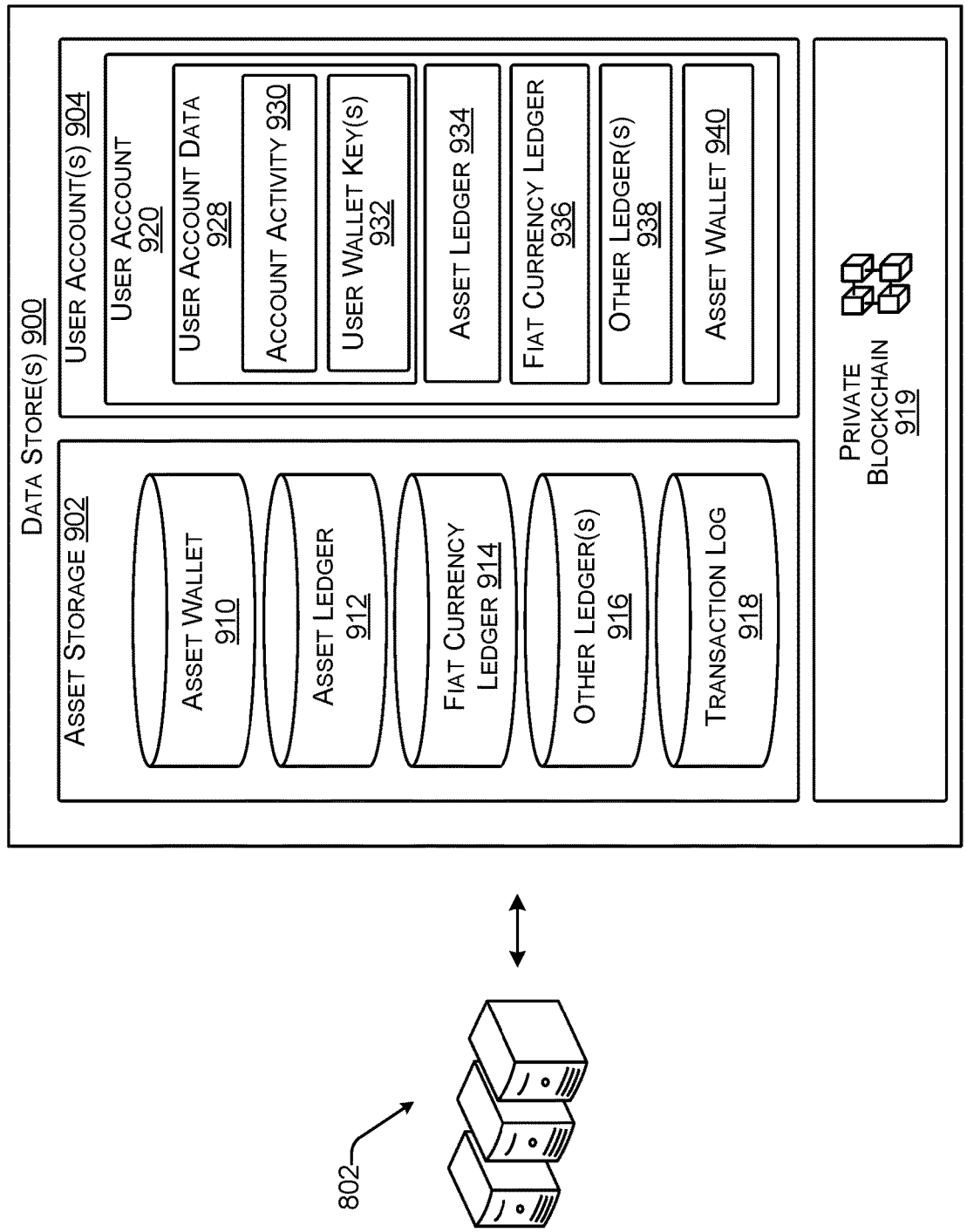
FIG. 9 is an example data store used for performing techniques described herein.

In some examples, the service provider can utilize a ledger system to track transfers of assets between users 814, 816. FIG. 9, below, provides additional details associated with such a ledger system. The ledger system can enable users 814, 816 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 818 executing on user device(s) of payee(s). As an example, the service provider can transfer assets from an account of user 816(A) to an account of the user 816(B) and can send a notification to the user device 808(B) of the user 816(B) for presentation via a user interface. The notification can indicate that a transfer is in process, a transfer is complete, or the like. In some examples, the service provider can send additional or alternative information to the instances of the payment application 818 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 802 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (v), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 818 executing on the user devices 806. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 8 or a third-party service provider associated with the server(s) 810. In examples where the content provider is a third-party service provider, the server(s) 810 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 8. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 806 (e.g., mobile device or conventional personal computer (PC)) based on instructions transmitted to and from the server(s) 802 (which, in such an example can be called a "messaging server"). In some instances, the messaging application can include a payment application with messaging capability that enables users of the payment application to communicate with one another. In such instances, the payment application can be executed on a user device 806 based on instructions transmitted to and from the server(s) 802 (e.g., the payment service discussed in this description or another payment service that supports payment transactions). In some examples, the messaging application can be provided by a third-party service provider associated with the server(s) 810. In examples where the messaging application is a third-party service provider, the server(s) 810 can be accessible via one or more APIs or other integrations.

As described above, the service provider can facilitate peer-to-peer transactions, which can enable users 814, 816 to transfer fiat currency, non-fiat currency, cryptocurrency, securities, or other assets, or portions thereof, to other users 814, 816. In at least one example, individual users can be associated with user accounts. Additional details associated with user accounts and the transfer of assets between users 814, 816 are described below with reference to FIG. 9.

Furthermore, the service provider of FIG. 8 can enable users 814, 816 to perform banking transactions via instances of the payment application 818. For example, users can configure direct deposits or other deposits for adding assets to their various ledgers/balances. Further, users 814, 816 can configure bill pay, recurring payments, and/or the like using assets associated with their accounts. In addition to sending and/or receiving assets via peer-to-peer transactions, users 814, 816 buy and/or sell assets via asset networks such as cryptocurrency networks, securities networks, and/or the like.

FIG. 9 is an example data store 900 used for performing techniques described herein. The data store(s) 900 can be associated with the server(s) 1002. The data store(s) 900 may be the same as or similar to the data store(s) 120 introduced in FIG. 1.

In at least one example, the data store(s) 900 can store assets in an asset storage 902, as well as data in user account(s) 904, merchant account(s) 906, and/or customer account(s) 908. In at least one example, the asset storage 902 can be used to store assets managed by the service provider of FIG. 8. In at least one example, the asset storage 902 can be used to record whether individual of the assets are registered to users. For example, the asset storage 902 can include an asset wallet 910 for storing records of assets owned by the service provider of FIG. 8, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1010 can be associated therewith. In some examples, the asset wallet 910 can communication with the asset network via one or more components associated with the server(s) 1002.

The asset wallet 910 can be associated with one or more addresses and can vary addresses used to acquire assets (e.g., from the asset network(s)) so that its holdings are represented under a variety of addresses on the asset network. In examples where the service provider of FIG. 8 has its own holdings of cryptocurrency (e.g., in the asset wallet 910), a user can acquire cryptocurrency directly from the service provider of FIG. 8. In some examples, the service provider of FIG. 8 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 902 may contain ledgers that store records of assignments of assets to users 1014, 1016. Specifically, the asset storage 902 may include asset ledger 910, fiat currency ledger 914, and other ledger(s) 916, which can be used to record transfers of assets between users 1014, 1016 of the service provider and/or one or more third-parties (e.g., merchant network(s), payment card network(s), ACH network(s), equities network(s), the asset network, securities networks, etc.). In doing so, the asset storage 902 can maintain a running balance of assets managed by the service provider of FIG. 8. The ledger(s) of the asset storage 902 can further indicate some of the running balance for each of the ledger(s) stored in the asset storage 902 is assigned or registered to one or more user account(s) 904.

In at least one example, the asset storage 902 can include transaction logs 918, which can include records of past transactions involving the service provider of FIG. 8. In at least one example, transaction data, as described herein, can be stored in association with the transaction logs 918.

In some examples, the data store(s) 900 can store a private blockchain 919. A private blockchain 919 can function to record sender addresses, recipient addresses, public keys, values of cryptocurrency transferred, and/or can be used to verify ownership of cryptocurrency tokens to be transferred. In some examples, the service provider of FIG. 8 can record transactions taking place within the service provider of FIG. 8 involving cryptocurrency until the number of transactions has exceeded a determined limit (e.g., number of transactions, storage space allocation, etc.). Based at least in part on determining that the limit has been reached, the service provider of FIG. 8 can publish the transactions in the private blockchain 919 to a public blockchain (e.g., associated with the asset network), where miners can verify the transactions and record the transactions to blocks on the public blockchain. In at least one example, the service provider of FIG. 8 can participate as miner(s) at least for its transactions to be posted to the public blockchain.

In at least one example, the data store(s) 900 can store and/or manage accounts, such as user account(s) 904, merchant account(s) 906, and/or customer account(s) 908. In at least one example, the user account(s) 904 may store records of user accounts associated with the users 1014. In at least one example, the user account(s) 904 can include a user account 920, which can be associated with a user (of the users 1014). Other user accounts of the user account(s) 904 can be similarly structured to the user account 920, according to some examples. In some examples, the user account 920 is the same as or similar to the account 110 introduced in FIG. 1, which is an account 110 associated with the application 106 for making payments with the application 106. In other examples, other user accounts may include more or less data and/or account information than that provided by the user account 920. In at least one example, the user account 920 can include user account data 928, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 928 can include account activity 930 and user wallet key(s) 932. The account activity 930 may include a transaction log for recording transactions associated with the user account 920. In some examples, the user wallet key(s) 932 can include a public-private key-pair and a respective address associated with the asset network or other asset networks. In some examples, the user wallet key(s) 932 may include one or more key pairs, which can be unique to the asset network or other asset networks.

In addition to the user account data 928, the user account 920 can include ledger(s) for account(s) managed by the service provider of FIG. 8, for the user. For example, the user account 920 may include an asset ledger 934, a fiat currency ledger 936, and/or one or more other ledgers 938. The ledger(s) can indicate that a corresponding user utilizes the service provider of FIG. 8 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 8.

In some examples, the asset ledger 934 can store a balance for each of one or more cryptocurrencies (e.g., Bitcoin, Ethereum, Litecoin, etc.) registered to the user account 920. In at least one example, the asset ledger 934 can further record transactions of cryptocurrency assets associated with the user account 920. For example, the user account 920 can receive cryptocurrency from the asset network using the user wallet key(s) 932. In some examples, the user wallet key(s) 932 may be generated for the user upon request. User wallet key(s) 932 can be requested by the user in order to send, exchange, or otherwise control the balance of cryptocurrency held by the service provider of FIG. 8 (e.g., in the asset wallet 910) and registered to the user. In some examples, the user wallet key(s) 932 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 8 and the value is credited as a balance in asset ledger 934), by purchasing currency in the form associated with the account using currency in a different form (e.g., buying a value of cryptocurrency from the service provider of FIG. 8 using a value of fiat currency reflected in fiat currency ledger, and crediting the value of cryptocurrency in asset ledger 934), or by conducting a transaction with another user (customer or merchant) of the service provider of FIG. 8 wherein the account receives incoming currency (which can be in the form associated with the account or a different form, in which the incoming currency may be converted to the form associated with the account). In some examples, the user account data 928 can include preferences for maintaining balances of individual of the ledgers. For example, the service provider of FIG. 8 can automatically debit the fiat currency ledger 936 to increase the asset ledger 934, or another account associated with the user whenever the cryptocurrency balance (e.g., of the asset ledger 934) falls below a stated level (e.g., a threshold). Conversely, in some embodiments, the service provider of FIG. 8 can automatically credit the fiat currency ledger 936 to decrease the asset ledger 934 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with the third-party server(s) 120) unrelated to the service provider of FIG. 8 (i.e., an external account). In at least one example, the user can transfer all or a portion of a balance of the cryptocurrency stored in the third-party cryptocurrency wallet to the service provider of FIG. 8. Such a transaction can require the user to transfer an amount of the cryptocurrency in a message signed by user's private key to an address provided by the service provider of FIG. 8. In at least one example, the transaction can be sent to miners to bundle the transaction into a block of transactions and to verify the authenticity of the transactions in the block. Once a miner has verified the block, the block is written to a public, distributed blockchain where the service provider of FIG. 8 can then verify that the transaction has been confirmed and can credit the user's asset ledger 934 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 8. As described above, in some examples, the service provider of FIG. 8 can acquire cryptocurrency from a third-party source (e.g., associated with the third-party server(s)). In such examples, the asset wallet 910 can be associated with different addresses and can vary addresses used to acquire cryptocurrency so that its holdings are represented under a variety of addresses on a blockchain. When the service provider of FIG. 8 has their own holdings of cryptocurrency, users can acquire cryptocurrency directly from the service provider of FIG. 8. In some examples, the service provider of FIG. 8 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 8 has its own cryptocurrency assets, cryptocurrency transferred in a transaction (e.g., data with address provided for receipt of transaction and a balance of cryptocurrency transferred in the transaction) can be stored in the asset wallet 910. In at least one example, the service provider of FIG. 8 can credit the asset ledger 934 of the user. Additionally, while the service provider of FIG. 8 recognizes that the user retains the value of the transferred cryptocurrency through crediting the asset ledger 934, any person that inspects the blockchain will see the cryptocurrency as having been transferred to the service provider of FIG. 8. In some examples, the asset wallet 910 can be associated with many different addresses. In such examples, any person that inspects the blockchain may not easily associate all cryptocurrency stored in asset wallet 910 as belonging to the same entity. It is this presence of a private ledger that is used for real-time transactions and maintained by the service provider of FIG. 8, combined with updates to the public ledger at other times, that allows for extremely fast transactions using cryptocurrency to be achieved. In some examples, the "private ledger" can refer to the asset ledger 910, which in some examples, can utilize the private blockchain 919, as described herein. The "public ledger" can correspond to a public blockchain associated with the asset network.

In at least one example, a user's asset ledger 934, fiat currency ledger 936, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 934. In some examples, a user can receive fiat currency or another currency in the form of payment for a transaction with another user. In at least one example, at least a portion of such funds can be converted into cryptocurrency by the service provider of FIG. 8 and used to fund the asset ledger 934 of the user.

As addressed above, in some examples, users can also have other accounts maintained by the service provider of FIG. 8. For example, a user can also have an account in U.S. dollars, which can be tracked, for example, via the fiat currency ledger 936. Such an account can be funded by transferring money from a bank account at a third-party bank to an account maintained by the service provider of FIG. 8 as is conventionally known. In some examples, a user can receive fiat currency in the form of payment for a transaction with another user. In such examples, at least a portion of such funds can be used to fund the fiat currency ledger 936.

In some examples, a user can have one or more internal payment cards registered with the service provider of FIG. 8. Internal payment cards can be linked to one or more of the accounts associated with the user account 920. In some embodiments, options with respect to internal payment cards can be adjusted and managed using an application (e.g., the payment application 1018).

In at least one example, as described above, each ledger can correspond to an account of the user that is managed by the service provider of FIG. 8. In at least one example, individual of the accounts can be associated with a wallet or a stored balance for use in payment transactions, peer-to-peer transactions, payroll payments, etc.

In at least one example, the user account 920 can be associated with an asset wallet 940. The asset wallet 940 of the user can be associated with account information that can be stored in the user account data 928 and, in some examples, can be associated with the user wallet key(s) 932. In at least one example, the asset wallet 940 can store data indicating an address provided for receipt of a cryptocurrency transaction. In at least one example, the balance of the asset wallet 940 can be based at least in part on a balance of the asset ledger 934. In at least one example, funds availed via the asset wallet 940 can be stored in the asset wallet 940 or the asset wallet 910. Funds availed via the asset wallet 910 can be tracked via the asset ledger 934. The asset wallet 940, however, can be associated with additional cryptocurrency funds.

In at least one example, when the service provider of FIG. 8 includes a private blockchain 919 for recording and validating cryptocurrency transactions, the asset wallet 940 can be used instead of, or in addition to, the asset ledger 934. For example, at least one example, a merchant can provide the address of the asset wallet 940 for receiving payments. In an example where a customer is paying in cryptocurrency and the customer has their own cryptocurrency wallet account associated with the service provider of FIG. 8, the customer can send a message signed by its private key including its wallet address (i.e., of the customer) and identifying the cryptocurrency and value to be transferred to the merchant's asset wallet 940. The service provider of FIG. 8 can complete the transaction by reducing the cryptocurrency balance in the customer's cryptocurrency wallet and increasing the cryptocurrency balance in the merchant's asset wallet 940. In addition to recording the transaction in the respective cryptocurrency wallets, the transaction can be recorded in the private blockchain 919 and the transaction can be confirmed. A user can perform a similar transaction with cryptocurrency in a peer-to-peer transaction as described above. In at least one example, the cryptocurrency wallet account 930 can be funded by a balance transfer from a third-party cryptocurrency wallet, as described above. Such a transaction can require a user to transfer an amount of cryptocurrency in a message signed by the user's private key to an address of the cryptocurrency wallet account 930. The transferred amount of cryptocurrency can then be within the cryptocurrency wallet account 930 for use in later transactions.

While the asset ledger 934 and/or asset wallet 940 are each described above with reference to cryptocurrency, the asset ledger 934 and/or asset wallet 940 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 8 is an aspect of the technology disclosed that enables technical advantages of increased processing speed and improved security.

Figure 10:
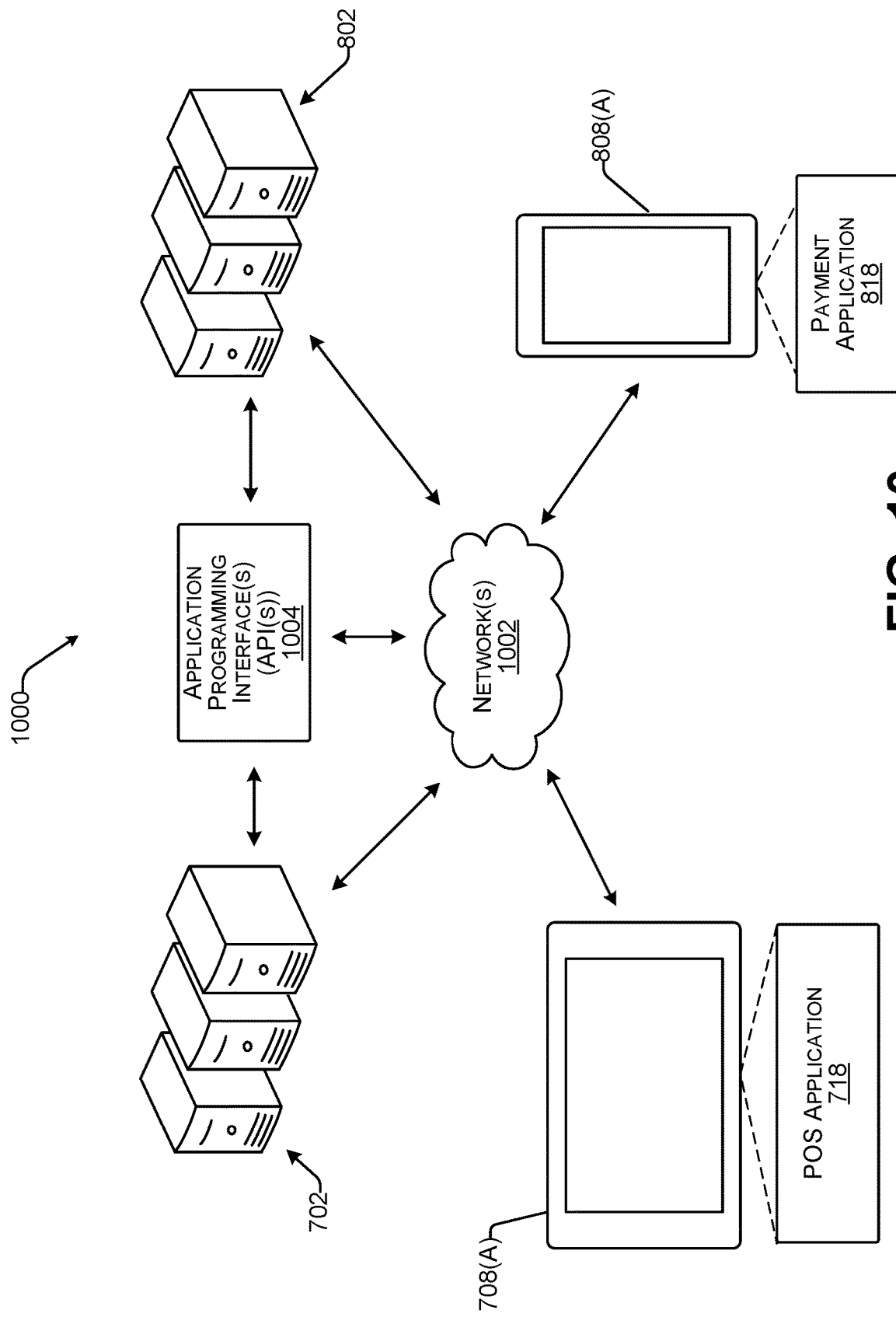
FIG. 10 is an example environment for performing techniques described herein.

FIG. 10 is an example environment 1000 for performing techniques described herein. In the environment 1000, the environment 1000 and the environment 1000 can be integrated to enable payments at the point-of-sale using assets associated with user accounts in the peer-to-peer environment of FIG. 8. As illustrated, each of the components can communicate with one another via one or more networks 1002. In some examples, one or more APIs 1004 or other functional components can be used to facilitate such communication.

In at least one example, the example environment 1000 can enable contactless payments, via integration of peer-to-peer payment, or other payment making, platform(s) and payment processing platform(s), are described herein. For the purpose of FIG. 10, the environment 1000 can refer to a payment processing platform and the environment 1000 can refer to a peer-to-peer payment, or payment making, platform. In an example, such an integration can enable a customer to participate in a transaction via their own computing device instead of interacting with a merchant device of a merchant, such as the merchant device 1008(A). In such an example, the POS application 1018, associated with a payment processing platform and executable by the merchant device 1008(A) of the merchant, can present a QR code, or other code that can be used to identify a transaction (e.g., a transaction code), in association with a transaction between the customer and the merchant. The QR code, or other transaction code, can be provided to the POS application 1018 via an API associated with the peer-to-peer payment platform. In an example, the customer can utilize their own computing device, such as the user device 1008(A), to capture the QR code, or the other transaction code, and to provide an indication of the captured QR code, or other transaction code, to server(s) 1002 and/or server(s) 1002.

Based at least in part on the integration of the peer-to-peer payment platform and the payment processing platform (e.g., via the API), the server(s) 1002 and/or 1002 associated with each can exchange communications with each other and with a payment application 1018 associated with the peer-to-peer payment platform and/or the POS application 1018 to process payment for the transaction using a peer-to-peer payment where the customer is a first "peer" and the merchant is a second "peer." in at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1008(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1008(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1018 and the payment application 1018, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1008(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 1018, associated with a payment processing platform, on the merchant device 1008(A), In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 1008(A) can present a QR code, or other transaction code, that can be associated with a peer-to-peer payment platform. The customer can use a camera associated with the user device 1008(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction between the customer computing device and the QR code can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 1018, associated with a payment processing platform, on the merchant device 1008(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 1018 can cause a text message with a resource locator (e.g., uniform resource locator (URL)) that can be associated with a peer-to-peer payment platform to be sent to the user device 1008(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction between the customer and the resource locator presented via the customer computing device can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 1008 (A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction between the customer computing device and the QR code can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 1018 of a merchant device 1008(A) at a brick-and-mortar store of a merchant to a payment application 1018 of a user device 1008(A) of a customer to enable the customer to participate in a transaction via their own computing device. For instance, in a "scan to pay" example as described above, based at least in part on capturing the QR code, or other transaction code, via the user device 1008(A), the payment processing platform can provide transaction data to the peer-to-peer payment platform for presentation via the payment application 1018 on the user device 1008(A). In some examples, the customer can watch items being added to their cart (e.g., via a user interface presented via the payment application). As an item is added to a virtual cart by the merchant via the POS application 1018 on the merchant device 1008(A) of the merchant the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 1018 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1008(A) during or after payment of the transaction.

In some examples, based at least in part on capturing the QR code, or other transaction code, the payment processing platform can provide transaction data to the peer-to-peer payment platform for presentation via the payment application 1018 on the computing device of the customer, such as the user device 1008(A), to enable the customer to complete the transaction via, their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer fluids from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer fluids to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1018 such that the customer can provide gratuity, feedback, loyalty information, or the like, via, an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below techniques described herein enable contactiess payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 1018, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in sone examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1018 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 11:
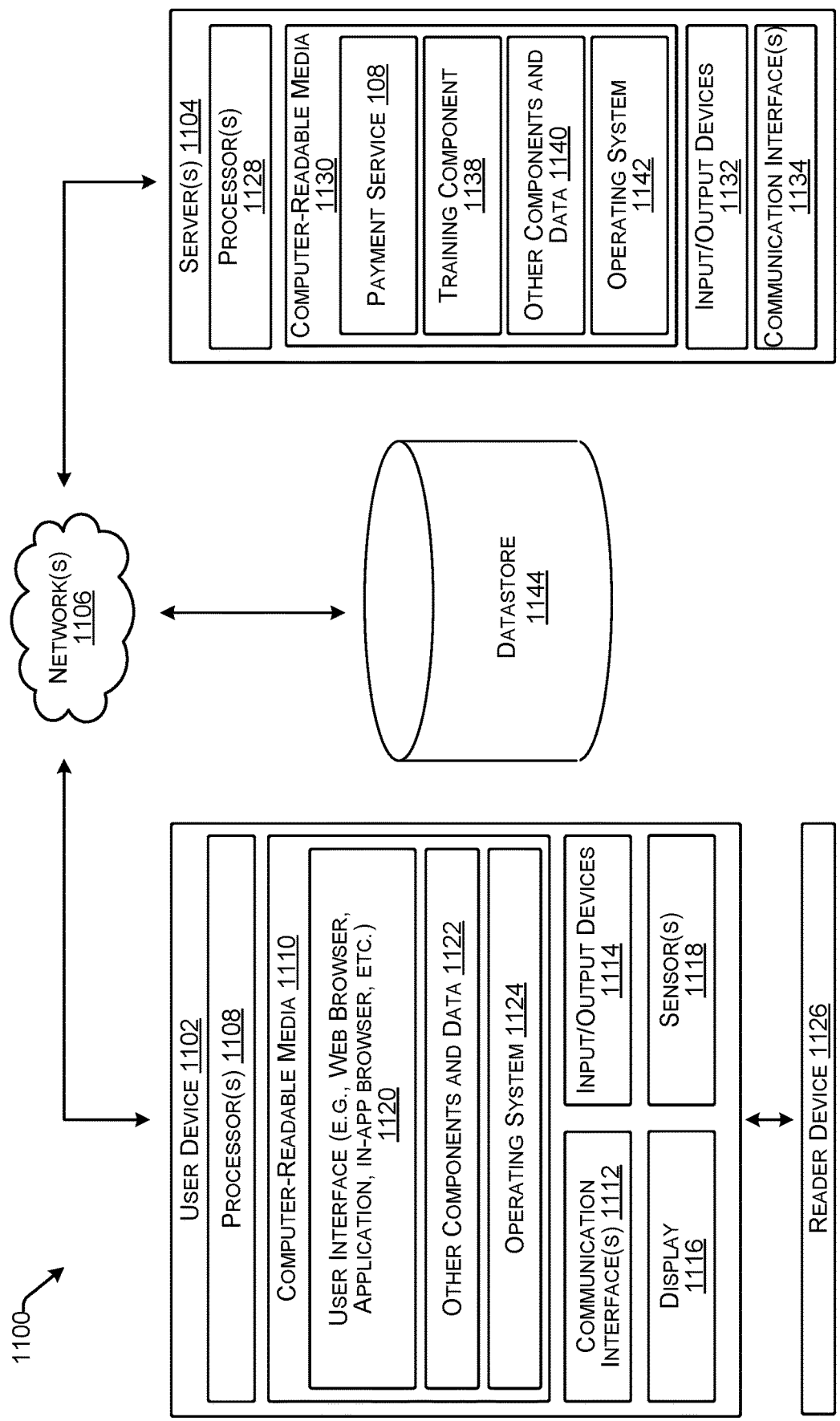
FIG. 11 is an example block diagram illustrating a system for performing techniques described herein.

FIG. 11 is an example block diagram 1100 illustrating a system for performing techniques described herein. The block diagram 1100 illustrates a system 1100 for performing techniques described herein. The system 1100 includes a user device 1102, that communicates with server computing device(s) (e.g., server(s) 1104) via network(s) 1106 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1102 is illustrated, in additional or alternate examples, the system 1100 can have multiple user devices, as described above with reference to FIG. 10.

For example, the server(s) 1104 may be the same as or similar to the server(s) 112 introduced in FIG. 1, and the server(s) 1104 may implement the payment service 108, which may implement some of the techniques described herein. Furthermore, the network(s) 1106 may be the same as or similar to the network(s) 118 introduced in FIG. 1, and the user device 1102 may be the same as or similar to the user device 104 introduced in FIG. 1.

In at least one example, the user device 1102 can be any suitable type of computing device, e.g., portable, semi-portable, semi-stationary, or stationary. Some examples of the user device 1102 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1102 can be any computing device capable of sending communications and performing the functions according to the techniques described herein. The user device 1102 can include devices, e.g., payment card readers, or components capable of accepting payments, as described below.

In the illustrated example, the user device 1102 includes one or more processors 1108, one or more computer-readable media 1110, one or more communication interface(s) 1112, one or more input/output (I/O) devices 1114, a display 1116, and sensor(s) 1118.

In at least one example, each processor 1108 can itself comprise one or more processors or processing cores. For example, the processor(s) 1108 can be implemented as one or more microprocessors, microcomputers, microcontrollers, digital signal processors, central processing units, state machines, logic circuitries, and/or any devices that manipulate signals based on operational instructions. In some examples, the processor(s) 1108 can be one or more hardware processors and/or logic circuits of any suitable type specifically programmed or configured to execute the algorithms and processes described herein. The processor(s) 1108 can be configured to fetch and execute computer-readable processor-executable instructions stored in the computer-readable media 1110.

Depending on the configuration of the user device 1102, the computer-readable media 1110 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1110 can include, but is not limited to, RAM, ROM, EEPROM, flash memory, solid-state storage, magnetic disk storage, optical storage, and/or other computer-readable media technology. Further, in some examples, the user device 1102 can access external storage, such as RAID storage systems, storage arrays, network attached storage, storage area networks, cloud storage, or any other medium that can be used to store information and that can be accessed by the processor(s) 1108 directly or through another computing device or network. Accordingly, the computer-readable media 1110 can be computer storage media able to store instructions, components or components that can be executed by the processor(s) 1108. Further, when mentioned, non-transitory computer-readable media exclude media such as energy, carrier signals, electromagnetic waves, and signals per se.

The computer-readable media 1110 can be used to store and maintain any number of functional components that are executable by the processor(s) 1108. In some implementations, these functional components comprise instructions or programs that are executable by the processor(s) 1108 and that, when executed, implement operational logic for performing the actions and services attributed above to the user device 1102. Functional components stored in the computer-readable media 1110 can include a user interface 1120 to enable users to interact with the user device 1102, and thus the server(s) 1104 and/or other networked devices. In at least one example, the user interface 1120 can be presented via a web browser, an in-app browser 122, or the like. In other examples, the user interface 1120 can be presented via an application, such as a mobile application or desktop application, which can be provided by a service provider associated with the server(s) 1104, or which can be an otherwise dedicated application. In some examples, the user interface 1120 can be any of the user interfaces 200, 202, and/or 300 described herein. In at least one example, a user can interact with the user interface via touch input, spoken input, gesture, or any other type of input. The word "input" is also used to describe "contextual" input that may not be directly provided by the user via the user interface 1120. For example, user's interactions with the user interface 1120 are analyzed using, e.g., natural language processing techniques, to determine context or intent of the user, which may be treated in a manner similar to "direct" user input.

In accordance with the examples described herein, an access request may be received from the user device 1102 to access an application 106. For instance, the server(s) 1104 may receive the access request from the user device 1102. An interactive element 210 may then be presented via a user interface 1120 of the application 106 (e.g., on the user device 1102). For instance, the user device 1102 may cause the application 106 to present the interactive element 210 via a user interface 1120 of the application 106, which may be the same as or similar to the user interface 200 depicted in FIG. 2. The interactive element 210, when selected, may cause a website 116 of a merchant to load to an in-app browser 122 within the application 106. A request may then be received via the in-app browser 122, the request being a request to initiate a payment to the merchant from an account 110 associated with the application 106. For instance, the user device 1102 executing the in-app browser 122 within the application 106 may receive the request, and/or the server(s) 1104 may receive the request to initiate the payment. Based at least in part on the request, a determination may be made that the request originated from within the application 106. For instance, the user device 1102 executing the in-app browser 122 may determine the origin of the request as being from within the application 106, and/or the server(s) 1104 may determine the origin of the request as being from within the application 106. Based at least in part on determining that the request originated from within the application 106, the payment may be authorized without additional input from a user associated with the user device 1102. For instance, the user device 1102 may cause the payment to be authorized by sending data to the payment service 108 (e.g., the server(s) 1104), and/or the server(s) 1104 may authorize the payment, as described herein.

Depending on the type of the user device 1102, the computer-readable media 1110 can also optionally include other functional components and data, such as other components and data 1122, which can include programs, drivers, etc., and the data used or generated by the functional components. In addition, the computer-readable media 1110 can also store data, data structures and the like, that are used by the functional components. Further, the user device 1102 can include many other logical, programmatic and physical components, of which those described are merely examples that are related to the discussion herein.

In at least one example, the computer-readable media 1110 can include additional functional components, such as an operating system 1124 for controlling and managing various functions of the user device 1102 and for enabling basic user interactions.

The communication interface(s) 1112 can include one or more interfaces and hardware components for enabling communication with various other devices, such as over the network(s) 1106 or directly. For example, communication interface(s) 1112 can enable communication through one or more network(s) 1106, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1106 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1102 can further include one or more input/output (I/O) devices 1114. The I/O devices 1114 can include speakers, a microphone, a camera, and various user controls (e.g., buttons, a joystick, a keyboard, a keypad, etc.), a haptic output device, and so forth. The I/O devices 1114 can also include attachments that leverage the accessories (audio-jack, USB-C, Bluetooth, etc.) to connect with the user device 1102.

In at least one example, user device 1102 can include a display 1116. Depending on the type of computing device(s) used as the user device 1102, the display 1116 can employ any suitable display technology. For example, the display 1116 can be a liquid crystal display, a plasma display, a light emitting diode display, an OLED (organic light-emitting diode) display, an electronic paper display, or any other suitable type of display able to present digital content thereon. In at least one example, the display 1116 can be an augmented reality display, a virtually reality display, or any other display able to present and/or project digital content. In some examples, the display 1116 can have a touch sensor associated with the display 1116 to provide a touchscreen display configured to receive touch inputs for enabling interaction with a graphic interface presented on the display 1116. Accordingly, implementations herein are not limited to any particular display technology. Alternatively, in some examples, the user device 1102 may not include the display 1116, and information can be presented by other means, such as aurally, haptically, etc.

In addition, the user device 1102 can include sensor(s) 1118. The sensor(s) 1118 can include a GPS device able to indicate location information. Further, the sensor(s) 1118 can include, but are not limited to, an accelerometer, gyroscope, compass, proximity sensor, camera, microphone, and/or a switch.

In some example, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with merchant(s) located proximate to the users. In at least one example, location can be used for taking payments from nearby customers when they leave a geofence, or location can be used to initiate an action responsive to users enter a brick-and-mortar store of a merchant. Location can be used in additional or alternative ways as well.

Additionally, the user device 1102 can include various other components that are not shown, examples of which include removable storage, a power source, such as a battery and power control unit, a barcode scanner, a printer, a cash drawer, and so forth.

In addition, in some examples, the user device 1102 can include, be connectable to, or otherwise be coupled to a reader device 1126, for reading payment instruments and/or identifiers associated with payment objects. In some examples, as described above, the reader device 1126 can plug in to a port in the user device 1102, such as a microphone port, a headphone port, an audio-jack, a data port, or other suitable port. In additional or alternative examples, the reader device 1126 can be coupled to the user device 1102 via another wired or wireless connection, such as via a Bluetooth®, BLE, and so on. The reader device 1126 can include a read head for reading a magnetic strip of a payment card, and further can include encryption technology for encrypting the information read from the magnetic strip. Additionally or alternatively, the reader device 1126 can be an EMV payment reader, which in some examples, can be embedded in the user device 1102. Moreover, numerous other types of readers can be employed with the user device 1102 herein, depending on the type and configuration of the user device 1102.

The reader device 1126 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1126 may include hardware implementation, such as slots, magnetic tracks, and rails with one or more sensors or electrical contacts to facilitate detection and acceptance of a payment instrument. That is, the reader device 1126 may include hardware implementations to enable the reader device 1126 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1126 may also include a biometric sensor to receive and process biometric characteristics and process them as payment instruments, given that such biometric characteristics are registered with the payment service system 100 and connected to a financial account with a bank server.

The reader device 1126 may include processing unit(s), computer-readable media, a reader chip, a transaction chip, a timer, a clock, a network interface, a power supply, and so on. The processing unit(s) of the reader device 1126 may execute one or more components and/or processes to cause the reader device 1126 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1126, the computer-readable media may include volatile memory (such as RAM), non-volatile memory (such as ROM, flash memory, miniature hard drive, memory card, or the like), or some combination thereof. In at least one example, the computer-readable media of the reader device 1126 may include at least one component for performing various functions as described herein.

The reader chip may perform functionalities to control the operations and processing of the reader device 1126. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 1112, which may provide a clock signal indicating a time. Furthermore, the reader chip may perform functionality to control the network interface, which may interface with the network(s) 1106, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1126. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1102, which can be a POS terminal, and the reader device 1126 are shown as separate devices, in additional or alternative examples, the user device 1102 and the reader device 1126 can be part of a single device, which may be a battery-operated device. In such an example, components of both the user device 1102 and the reader device 1126 may be associated with the single device. In some examples, the reader device 1126 can have a display integrated therewith, which can be in addition to (or as an alternative of) the display 1116 associated with the user device 1102.

The server(s) 1104 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1104 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1104 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1104 can include one or more processors 1128, one or more computer-readable media 1130, one or more I/O devices 1132, and one or more communication interfaces 1134. Each processor 1128 can be a single processing unit or a number of processing units, and can include single or multiple computing units or multiple processing cores. The processor(s) 1128 can be implemented as one or more microprocessors, microcomputers, microcontrollers, digital signal processors, central processing units, state machines, logic circuitries, and/or any devices that manipulate signals based on operational instructions. For example, the processor(s) 1128 can be one or more hardware processors and/or logic circuits of any suitable type specifically programmed or configured to execute the algorithms and processes described herein. The processor(s) 1128 can be configured to fetch and execute computer-readable instructions stored in the computer-readable media 1130, which can program the processor(s) 1128 to perform the functions described herein.

The computer-readable media 1130 can include volatile and nonvolatile memory and/or removable and non-removable media implemented in any type of technology for storage of information, such as computer-readable instructions, data structures, program components, or other data. Such computer-readable media 1130 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1104, the computer-readable media 1130 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1130 can be used to store any number of functional components that are executable by the processor(s) 1128. In many implementations, these functional components comprise instructions or programs that are executable by the processors 1128 and that, when executed, specifically configure the one or more processors 1128 to perform the actions attributed above to the service provider and/or payment processing service. Functional components stored in the computer-readable media 1130 can optionally include a payment service 108, as described herein, a training component 1138, and one or more other components and data 1140.

The training component 1138 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1102 and/or the server(s) 1104 for use at a time after the data models have been trained (e.g., at runtime).

The one or more other components and data 1140 can include the sub-components of the payment service 108, the functionality of which is described, at least partially, above. Further, the one or more other components and data 1140 can include a merchant component configured to receive transaction data from POS systems, such as the POS system 724 described above with reference to FIG. 7. Such a merchant component can transmit requests (e.g., authorization, capture, settlement, etc.) to payment service server computing device(s) to facilitate POS transactions between merchants and customers. Such a merchant component can communicate the successes or failures of the POS transactions to the POS systems. Further, the one or more other components and data 1140 can include programs, drivers, etc., and the data used or generated by the functional components. Further, the server(s) 1104 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1130 can additionally include an operating system 1142 for controlling and managing various functions of the server(s) 1104.

The communication interface(s) 1134 can include one or more interfaces and hardware components for enabling communication with various other devices, such as over the network(s) 1106 or directly. For example, communication interface(s) 1134 can enable communication through one or more network(s) 1106, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1102 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1104 can further be equipped with various I/O devices 1132. Such I/O devices 1132 can include a display, various user interface controls (e.g., buttons, joystick, keyboard, mouse, touch screen, biometric or sensory input devices, etc.), audio speakers, connection ports and so forth.

In at least one example, the system 1100 can include a datastore 1144 that can be configured to store data that is accessible, manageable, and updatable. The data store 1144 may be the same as or similar to the data store(s) 120 introduced in FIG. 1. In some examples, the datastore 1144 can be integrated with the user device 1102 and/or the server(s) 1104. In other examples, as shown in FIG. 11, the datastore 1144 can be located remotely from the server(s) 1104 and can be accessible to the server(s) 1104. The datastore 1144 can comprise multiple databases and/or servers connected locally and/or remotely via the network(s) 1106.

In at least one example, the datastore 1144 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

In at least one example, the account(s) can include or be associated with the merchant profiles and/or customer profiles described above.

Furthermore, in at least one example, the datastore 1144 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1144 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Further embodiments are described in the following numbered clauses:

A. A computer-implemented method comprising: receiving, via a user device, an access request to access a payment application, wherein the access request is associated with first data to authenticate a user associated with the user device, wherein upon authentication, the user is authorized to use an account associated with the payment application for making payments; presenting an interactive element via a user interface of the payment application, wherein the interactive element causes an ecommerce website of a merchant to load to an in-app browser within the payment application when the interactive element is selected; receiving, via the in-app browser, a payment request to initiate a payment from the account associated with the payment application to the merchant; determining, based on the payment request, that the payment request originated from within the payment application; and based on the determining, authorizing the payment based on the first data associated with the access request without additional input from the user, wherein the authorizing comprises accessing a stored balance associated with the account associated with the payment application for withdrawing funds for payment to the merchant.

B. The computer-implemented method of clause A, further comprising: prior to the receiving of the payment request, providing, by the payment application, code to the in-app browser, wherein the determining is based on the code.

C. The computer-implemented method of any preceding clause, further comprising, after the determining and prior to the authorizing: receiving, by the payment application, second data based on the in-app browser executing code received from a web server associated with the ecommerce website; and sending, by the payment application, the second data to a backend computing system of a payment service associated with the payment application, wherein the authorizing is further based on the second data.

D. The computer-implemented method of any preceding clause, wherein the additional input from the user comprises: input provided to another application launched on the user device based on a deep link; entry of a one-time passcode via the user device; multi-factor authentication input provided via the user device; and entry of user credentials via the user device.

E. A system comprising: one or more processors; and computer-executable instructions that, when executed by the one or more processors, cause the one or more processors to perform operations comprising: receiving an access request to access an application on a user device; presenting a first interactive element via a user interface of the application, wherein the first interactive element causes a website of a merchant to load to an in-app browser within the application when the first interactive element is selected; receiving, via the in-app browser, a payment request to initiate a payment to the merchant from an account associated with the application; determining, based at least in part on the payment request, that the payment request originated from within the application; and based at least in part on the determining, authorizing the payment without additional input from a user associated with the user device.

F. The system of clause E, the operations further comprising causing an indication that the payment has been authorized to be presented on the website within the in-app browser based at least in part on the authorizing.

G. The system of clause E or F, the operations further comprising causing a checkout process to proceed via the website within the in-app browser based at least in part on the authorizing.

H. The system of any of clauses E-G, the operations further comprising: prior to the receiving of the payment request, providing, by the application, code to the in-app browser, wherein the determining is based at least in part on the code.

I. The system of any of clauses E-H, the operations further comprising, after the determining and prior to the authorizing: receiving, by the application, data based at least in part on the in-app browser executing code received from a web server associated with the website; and sending, by the application, the data to a backend computing system of a payment service associated with the application, wherein the authorizing is based at least in part on the data.

J. The system of any of clauses E-I, wherein the authorizing comprises: accessing user data associated with the user; and causing a checkout process to be completed without user intervention, via the website, based at least in part on the user data.

K. The system of any of clauses E-J, wherein: the access request is associated with data to authenticate the user; and the authorizing is based at least in part on the data.

L. The system of any of clauses E-K, wherein the application is a payment application for making payments.

M. The system of any of clauses E-L, wherein the receiving of the payment request is based on a selection of a second interactive element presented on the website within the in-app browser.

N. A computer-implemented method comprising: receiving, via a user device, an access request to access an application; causing a website of a merchant to load to an in-app browser within the application; receiving, via the in-app browser, a payment request to initiate a payment to the merchant from an account associated with the application; determining, based at least in part on the payment request, that the payment request originated from within the application; and based at least in part on the determining, authorizing the payment without additional input from a user associated with the user device.

O. The computer-implemented method of clause N, further comprising causing an indication that the payment has been authorized to be presented on the website within the in-app browser based at least in part on the authorizing.

P. The computer-implemented method of clause N or O, further comprising causing a checkout process to proceed via the website within the in-app browser based at least in part on the authorizing.

Q. The computer-implemented method of any of clauses N-P, further comprising: prior to the receiving of the payment request, providing, by the application, code to the in-app browser, wherein the determining is based at least in part on the code.

R. The computer-implemented method of any of clauses N-Q, further comprising, after the determining and prior to the authorizing: receiving, by the application, data based at least in part on the in-app browser executing code received from a web server associated with the website; and sending, by the application, the data to a backend computing system of a payment service associated with the application, wherein the authorizing is based at least in part on the data.

S. The computer-implemented method of any of clauses N-R, wherein the authorizing comprises: accessing user data associated with the user; and causing a checkout process to be completed without user intervention, via the website, based at least in part on the user data.

T. The computer-implemented method of any of clauses N-S, wherein: wherein the access request is associated with data to authenticate the user; and the authorizing is based at least in part on the data.

What is claimed is:

1. A computer-implemented method comprising:
integrating payment functionality availed via a payment application associated with a payment service into an ecommerce website of a merchant;
receiving, via a user device, an access request to access the payment application, wherein the access request is associated with data to authenticate a user associated with the user device, wherein, upon authentication the user is authorized to use a user account associated with the payment application for making payments;
presenting, by the payment application, an interactive element via a user interface of the payment application, wherein the interactive element, when selected, causes the ecommerce website of the merchant to load to an in-app browser within the payment application when the interactive element is selected;
providing, by the payment application and for use subsequently indicating when requests to initiate payment originate from within the payment application, code to the in-app browser;
receiving, via the in-app browser, a payment request to initiate a payment from the user account associated with the payment application to the merchant, wherein the previously-provided code is associated with the payment request to indicate that the payment request originated from within the payment application;
determining, by the in-app browser and based on the previously-provided code, that the payment request originated from within the payment application; and
based on the determining, causing, by the payment application, a backend computing system of the payment service associated with the payment application to authorize the payment to the merchant based on the data associated with the access request without additional input from the user, wherein causing the backend computing system to authorize the payment comprises accessing, via the backend computing system, at least one of a stored balance associated with the user account or an external account associated with the user account for withdrawing funds for payment to the merchant.

2. The computer-implemented method of claim 1, further comprising, after the determining and prior to causing the backend computing system to authorize the payment:
receiving, by the payment application, second data based on the in-app browser executing the previously-provided code received from a web server associated with the ecommerce web site; and
sending, by the payment application, the second data to the backend computing system,
wherein causing the backend computing system to authorize the payment is further based on the second data.

3. The computer-implemented method of claim 1, wherein the additional input from the user comprises at least one of:
input provided to another application launched on the user device based on a deep link;
entry of a one-time passcode via the user device;
multi-factor authentication input provided via the user device; or
entry of user credentials via the user device.

4. A system comprising:
one or more processors; and
computer-executable instructions that, when executed by the one or more processors, cause the one or more processors to perform operations comprising:
receiving an access request to access a payment application on a user device;
presenting an interactive element via a user interface of the payment application, wherein the interactive element, when selected, causes a web site of a merchant to load to an in-app browser within the payment application;
providing, by the payment application and for use subsequently indicating when requests to initiate payment originated from within the payment application, code to the in-app browser;

receiving, via the in-app browser, a payment request to initiate a payment to the merchant from a user account associated with the payment application, wherein the previously-provided code is associated with the payment request to indicate that the payment request originated from within the payment application;

determining, by the in-app browser and based at least in part on the previously-provided code, that the payment request originated from within the payment application; and based at least in part on the determining, causing the payment to the merchant to be authorized without additional input from a user associated with the user device.

5. The system of claim 4, the operations further comprising causing an indication that the payment has been authorized to be presented on the website within the in-app browser based at least in part on the payment having been authorized.

6. The system of claim 4, the operations further comprising causing a checkout process to proceed via the website within the in-app browser based at least in part on the payment having been authorized.

7. The system of claim 4, the operations further comprising, after the determining and prior to causing the payment to be authorized:

receiving, by the payment application, data based at least in part on the in-app browser executing the previously-provided code received from a web server associated with the website; and sending, by the payment application, the data to a backend computing system of a payment service associated with the payment application, wherein causing the payment to be authorized is based at least in part on the data.

8. The system of claim 4, wherein causing the payment to be authorized comprises:

accessing user data associated with the user; and causing a checkout process to be completed, without user intervention, via the website based at least in part on the user data.

9. The system of claim 4, wherein:

the access request is associated with data to authenticate the user; and causing the payment to be authorized is based at least in part on the data.

10. The system of claim 4, wherein the receiving of the payment request is based on a selection of a second interactive element presented on the website within the in-app browser.

11. A computer-implemented method comprising:

receiving, via a user device, an access request to access a payment application;

causing a website of a merchant to load to an in-app browser within the payment application;

providing, by the payment application and for use subsequently indicating when requests to initiate payment originated from within the payment application, code to the in-app browser;

receiving, via the in-app browser, a payment request to initiate a payment to the merchant from a user account associated with the payment application, wherein the previously-provided code is associated with the payment request to indicate that the payment request originated from within the payment application;

determining, by the in-app browser and based at least in part on the previously-provided code, that the payment request originated from within the payment application; and based at least in part on the determining, causing the payment to the merchant to be authorized without additional input from a user associated with the user device.

12. The computer-implemented method of claim 11, further comprising causing an indication that the payment has been authorized to be presented on the website within the in-app browser based at least in part on the payment having been authorized.

13. The computer-implemented method of claim 11, further comprising causing a checkout process to proceed via the website within the in-app browser based at least in part on the payment having been authorized.

14. The computer-implemented method of claim 11, further comprising, after the determining and prior to causing the payment to be authorized:

receiving, by the payment application, data based at least in part on the in-app browser executing the previously-provided code received from a web server associated with the website; and sending, by the payment application, the data to a backend computing system of a payment service associated with the payment application, wherein causing the payment to be authorized is based at least in part on the data.

15. The computer-implemented method of claim 11, wherein causing the payment to be authorized comprises:

accessing user data associated with the user; and causing a checkout process to be completed, without user intervention, via the website based at least in part on the user data.

16. The computer-implemented method of claim 11, wherein:

the access request is associated with data to authenticate the user; and causing the payment to be authorized is based at least in part on the data.

17. The computer-implemented method of claim 1, wherein the integrating is facilitated by a software development kit (SDK) provided by the payment service associated with the payment application.

18. The computer-implemented method of claim 1, wherein the in-app browser is configured to detect the payment request based at least in part on the previously-provided code.

19. The computer-implemented method of claim 1, wherein providing the code to the in-app browser is configured to create a custom, secure communication channel to send data directly between the in-app browser and the payment application.

20. The computer-implemented method of claim 1, wherein providing the code to the in-app browser is configured to cause a global object to be set on a window, wherein determining that the payment request originated from within the payment application is based at least in part on the global object.

* * * * *